United States Patent
Deolaliker et al.

(10) Patent No.: US 8,093,989 B2
(45) Date of Patent: Jan. 10, 2012

(54) METHOD AND SYSTEM FOR SCHEDULING MULTI-RADIO-FREQUENCY-IDENTIFICATION-TAG-READER NETWORKS TO INCREASE INTERROGATION EFFICIENCY

(76) Inventors: Vinay Deolaliker, Mountain View, CA (US); John L. Recker, Mountain View, CA (US); Malena R. Mesarina, San Francisco, CA (US); Salil Pradhan, Santa Clara, CA (US)

( * ) Notice: Subject to any disclaimer, the term of this patent is extended or adjusted under 35 U.S.C. 154(b) by 1342 days.

(21) Appl. No.: 11/635,738

(22) Filed: Dec. 6, 2006

(65) Prior Publication Data

US 2008/0136638 A1    Jun. 12, 2008

(51) Int. Cl.
*H04Q 5/22* (2006.01)
(52) U.S. Cl. .................. 340/10.2; 340/572.1; 340/10.4
(58) Field of Classification Search ........ 340/10.1–10.6, 340/572.1–572.9, 825; 370/370; 235/385
See application file for complete search history.

(56) References Cited

U.S. PATENT DOCUMENTS

| | | | | |
|---|---|---|---|---|
| 7,324,015 | B1 * | 1/2008 | Allen et al. | 340/933 |
| 7,817,014 | B2 * | 10/2010 | Krishna et al. | 340/10.4 |
| 7,898,391 | B2 * | 3/2011 | Maguire et al. | 340/10.2 |
| 2006/0022815 | A1 * | 2/2006 | Fischer et al. | 340/505 |

* cited by examiner

*Primary Examiner* — Benjamin C Lee
*Assistant Examiner* — Peter Mehravari

(57) ABSTRACT

Methods and systems of the present invention employ perturbation techniques for configuring RFID-tag-reader networks in order to achieve increased overall efficiency of a network of RFID-tag readers. According to described embodiments of the present invention, individual RFID-tag readers within a multi-RFID-tag-reader network may be removed or shut down, or RFID-tag readers may be displaced relative to one another, in order to remove interferences between RFID-tag readers and to increase the interrogation efficiency of the multi-RFID-tag-reader network. A method embodiment of the present invention schedules a multi-RFID-tag-reader network as a cycle of power-on/power-off intervals.

10 Claims, 40 Drawing Sheets

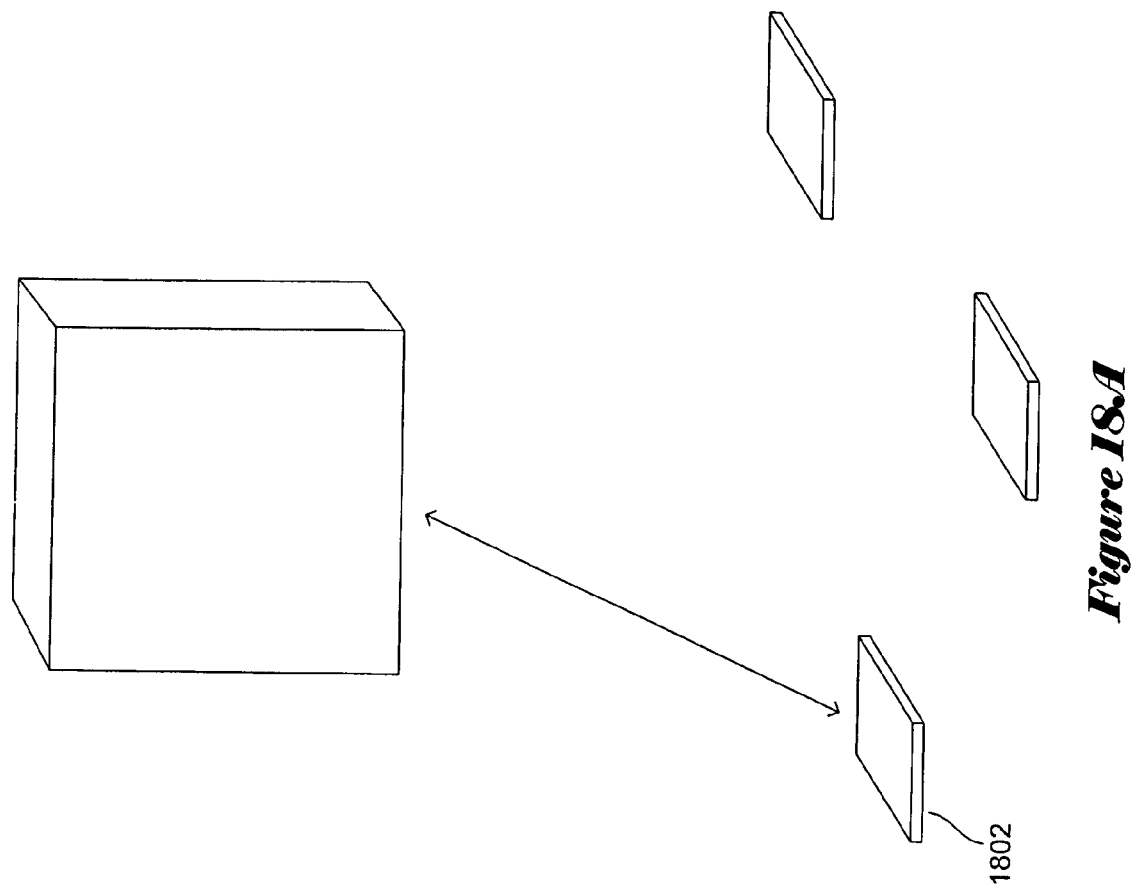

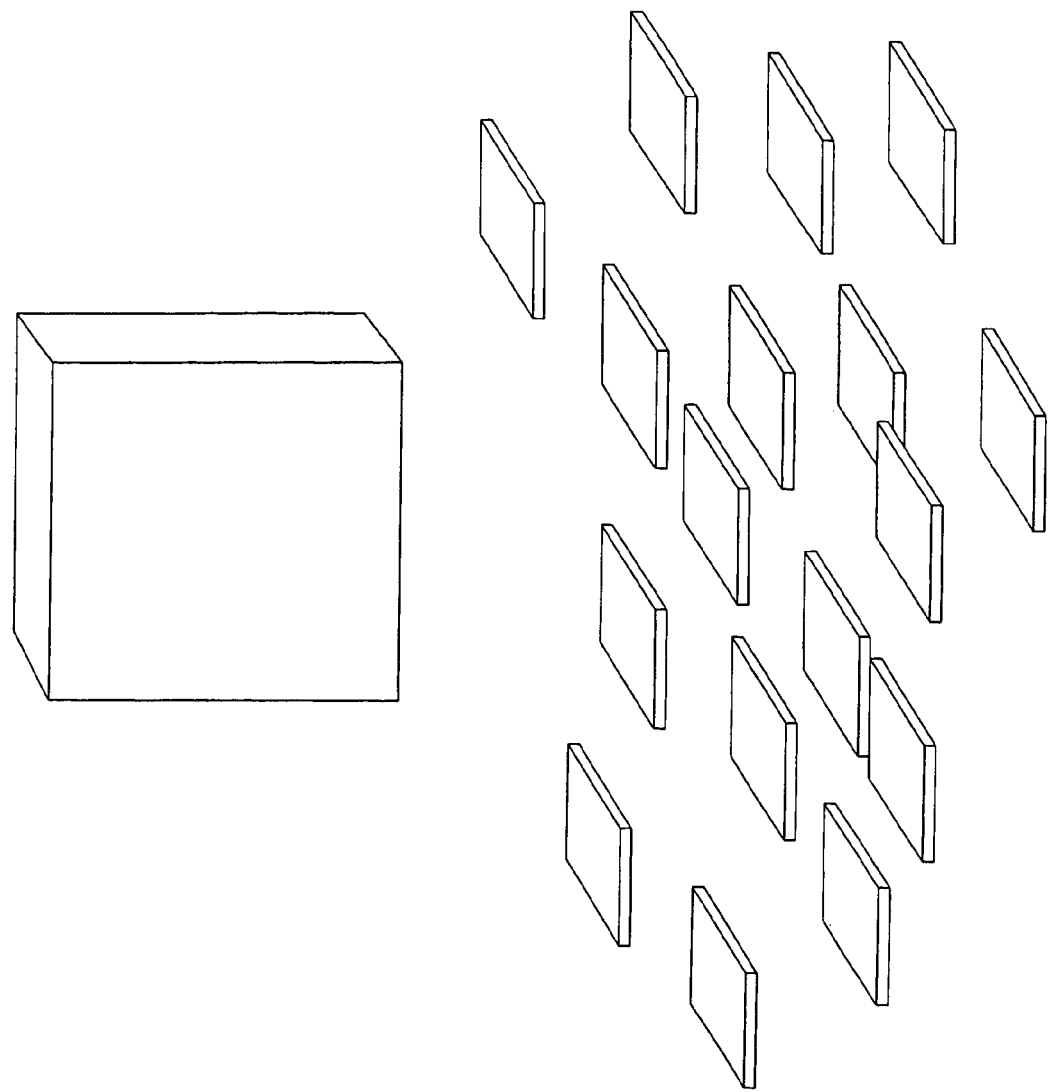

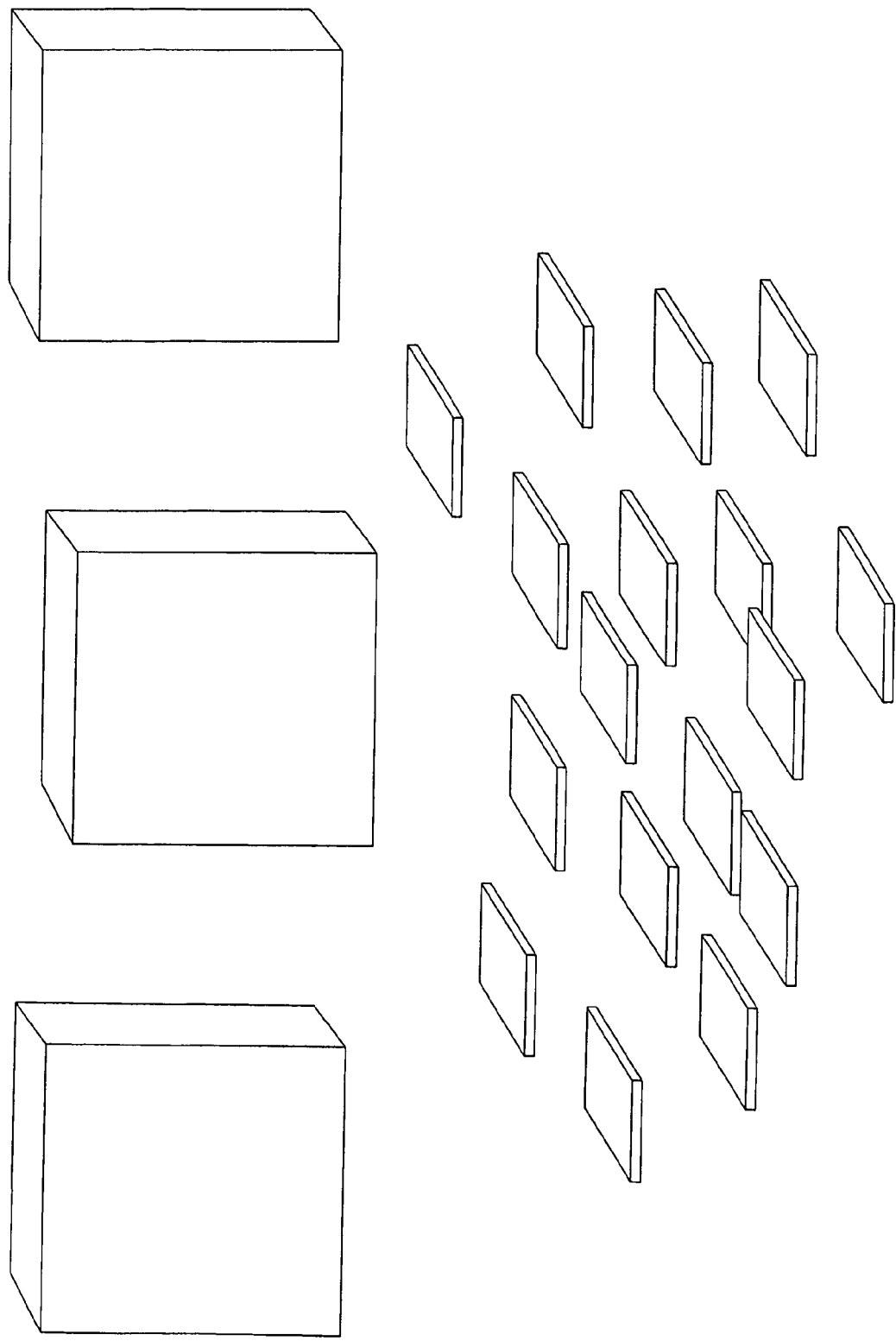

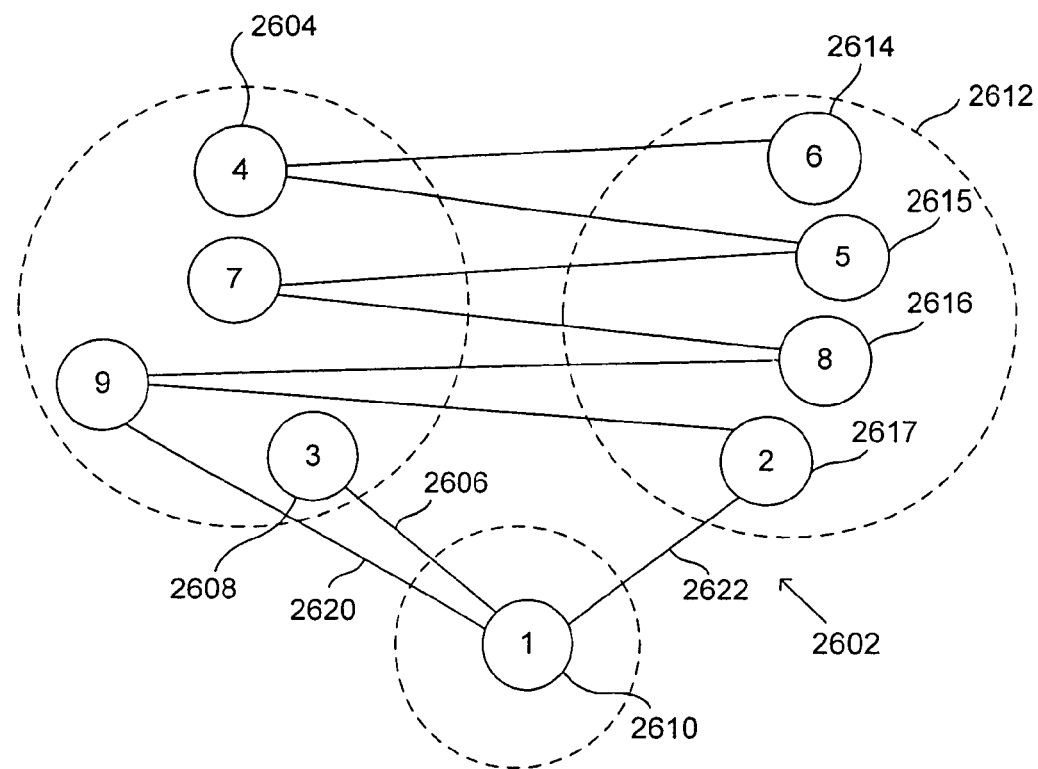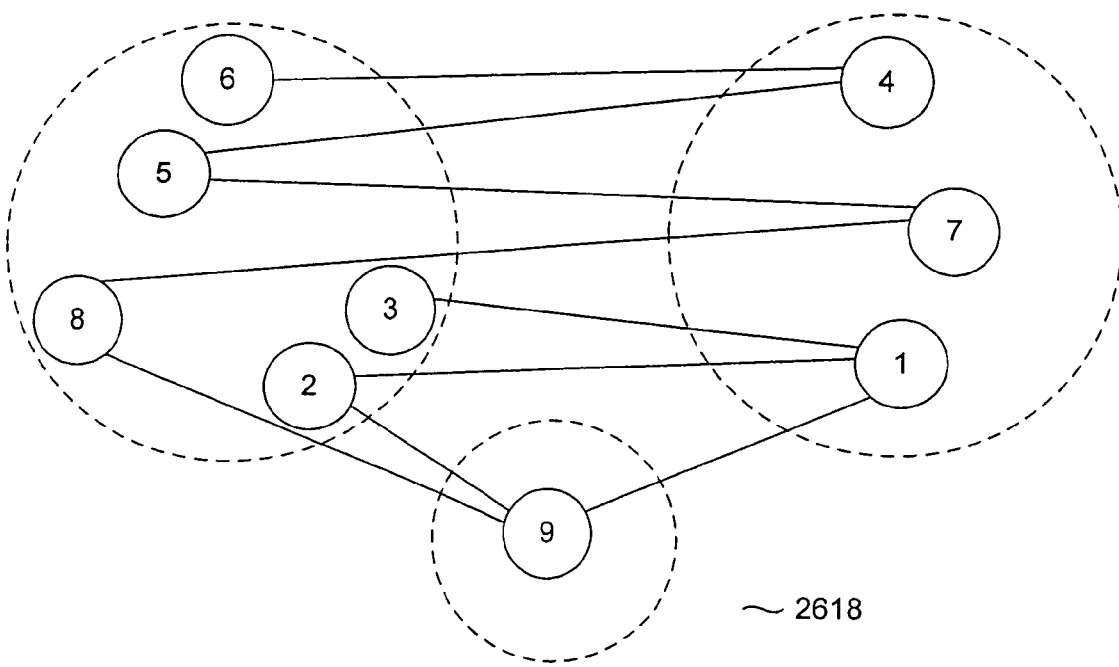
*Figure 26*

METHOD AND SYSTEM FOR SCHEDULING MULTI-RADIO-FREQUENCY-IDENTIFICATION-TAG-READER NETWORKS TO INCREASE INTERROGATION EFFICIENCY

TECHNICAL FIELD

Methods and systems of the present invention are related to analysis and configuration of multi-radio-frequency-identification-tag reader networks and, in particular, to methods and systems for increasing the efficiency of a multi-radio-frequency-identification-tag reader networks by scheduling power-on and power-off intervals of sets of RFID-tag readers in multi-radio-frequency-identification reader networks.

BACKGROUND OF THE INVENTION

A large research and development effort has been directed to radio frequency identification ("RFID") technologies during the past ten years. As a result of these efforts, and as a result of their utility and economy, RFID tags and RFID-tag readers have found widespread, commercial application in a variety of disparate fields, from identification of pets to inventory management and inventory control. As discussed in the following sections, techniques have been developed to allow an RFID reader to interrogate, or read the contents of, multiple RFID tags within the RFID-tag reader's physical range of interrogation, or field. Despite advances in this area, however, the efficiency of an RFID-tag reader may be, in certain applications, significantly less than a desirable or needed efficiency, and significantly less than the RFID-tag reader's theoretical maximum efficiency under optimal conditions. Less research and development effort has been devoted to reading of RFID tags by multiple, interfering RFID-tag readers. In many applications, mutually interfering RFID-tag readers severely constrain, or even completely prohibit, effective interrogation of RFID tags by the mutually interfering RFID-tag readers, leading to low efficiency of multi-RFID-tag-reader networks that include mutually interfering RFID-tag readers. For these reasons, RFID researchers and developers, as well as manufacturers, vendors, and users of RFID tags and RFID-tag systems, have recognized the need for methods for improving the efficiencies of multi-RFID-tag-reader networks that include two or more mutually interfering RFID-tag readers.

SUMMARY OF THE INVENTION

Methods and systems of the present invention employ perturbation techniques for configuring RFID-tag-reader networks in order to achieve increased overall efficiency of a network of RFID-tag readers. According to described embodiments of the present invention, individual RFID-tag readers within a multi-RFID-tag-reader network may be removed or shut down, or RFID-tag readers may be displaced relative to one another, in order to remove interferences between RFID-tag readers and to increase the interrogation efficiency of the multi-RFID-tag-reader network. A method embodiment of the present invention schedules a multi-RFID-tag-reader network as a cycle of power-on/power-off intervals.

BRIEF DESCRIPTION OF THE DRAWINGS

FIGS. 18A-C illustrate one time-based multiplexing technique that employs a collision-avoidance technique.
FIG. 19 shows a number of different RFID tags within the field of, and properly oriented with respect to, a single RFID-tag reader.
FIG. 20 shows a number of different RFID tags within the field of, and properly oriented with respect to, three different RFID-tag readers.
FIG. 26 illustrates two different collision-graph representations of the multi-RFID-tag-reader network shown in FIGS. 21 and 24-25.
FIG. 28 illustrates a first period in a cycle of power-on/power-off operations of the interrogation strategy in which RFID-tag readers of an independent subgroup are powered-on.
FIG. 29 illustrates a second period in a cycle of power-on/power-off operations of an interrogation strategy in which RFID-tag readers of a second independent subgroup are powered-on.

DETAILED DESCRIPTION OF THE INVENTION

Methods and systems of the present invention employ scheduling of power-on and power-off intervals for subsets of RFID-tag readers in a multi-RFID-tag reader networks to increase the efficiencies of multi-RFID-tag-reader networks. RFID-tag-reader networks are modeled by collision graphs, in described embodiments of the present invention, and the collision graphs are analyzed and may be modified by techniques based on graph theory to produce models of potentially more efficient RFID-tag-reader networks. In a first subsection, various aspects of graph theory are provided as a foundation for descriptions of embodiments of the present invention. In a second subsection, an exemplary multi-RFID-tag-reader network is described, followed by descriptions of method embodiments of the present invention. In a third subsection, a C++-like pseudocode implementation of one embodiment of the present invention is provided.

Brief Overview of Relevant Aspects of Graph Theory

Figure 1:
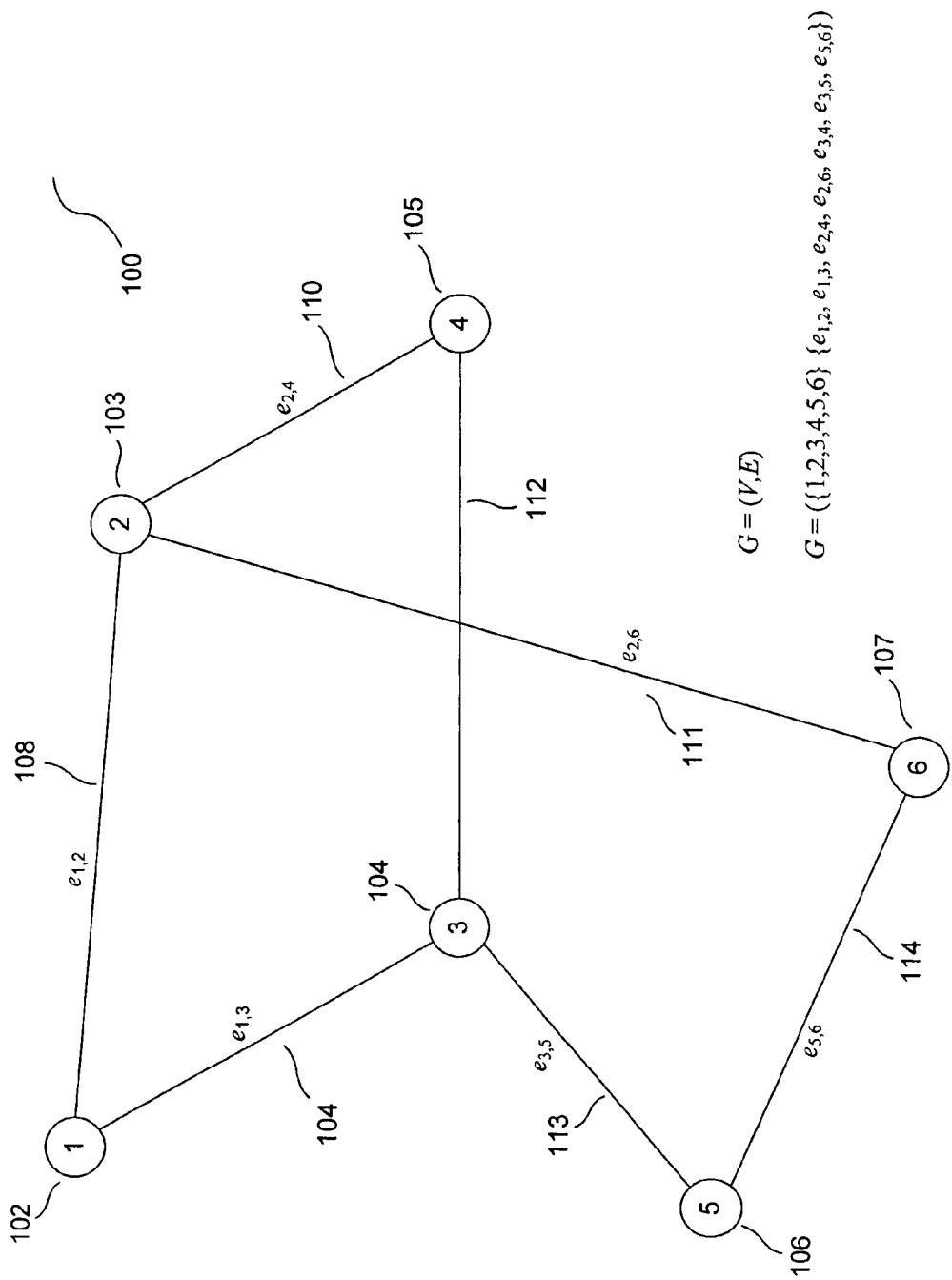
FIG. 1 illustrates a simple, undirected graph G.

FIG. 1 illustrates a simple, undirected graph G. The graph G 100 comprises includes nodes 102-107 that together compose a set of nodes V and edges 108-114 that together compose a set of edges E. In the graph G shown in FIG. 1, the nodes, or vertices, are shown as circles with numerical labels 1-6, and the edges are each labeled as $e_{x,y}$ where x and y are the numerical labels of the vertices directly connected by the edge. Mathematically, a graph G is represented as:

$$G=(V,E)$$

where V is the set of vertices and E is the set of edges. For the graph shown in FIG. 1, the graph can be explicitly defined as:

$$G=(\{1,2,3,4,5,6\},\{e_{1,2},e_{1,3},e_{2,4},e_{2,6},e_{3,4},e_{3,5},e_{5,6}\})$$

Figure 2:
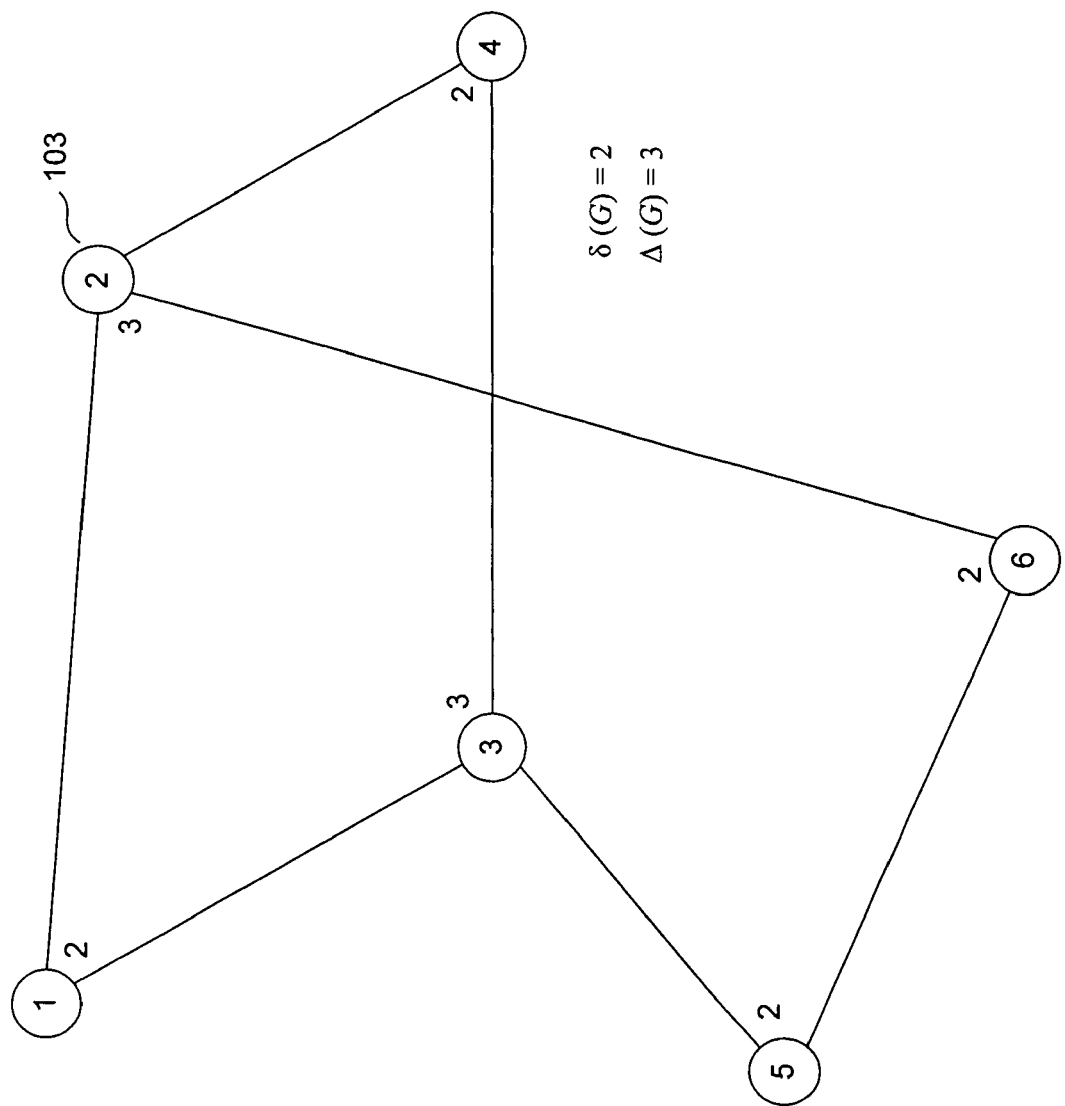
FIGS. 2-4 illustrate various characteristics of graphs using the graph G shown in FIG. 1.
Figure 3:
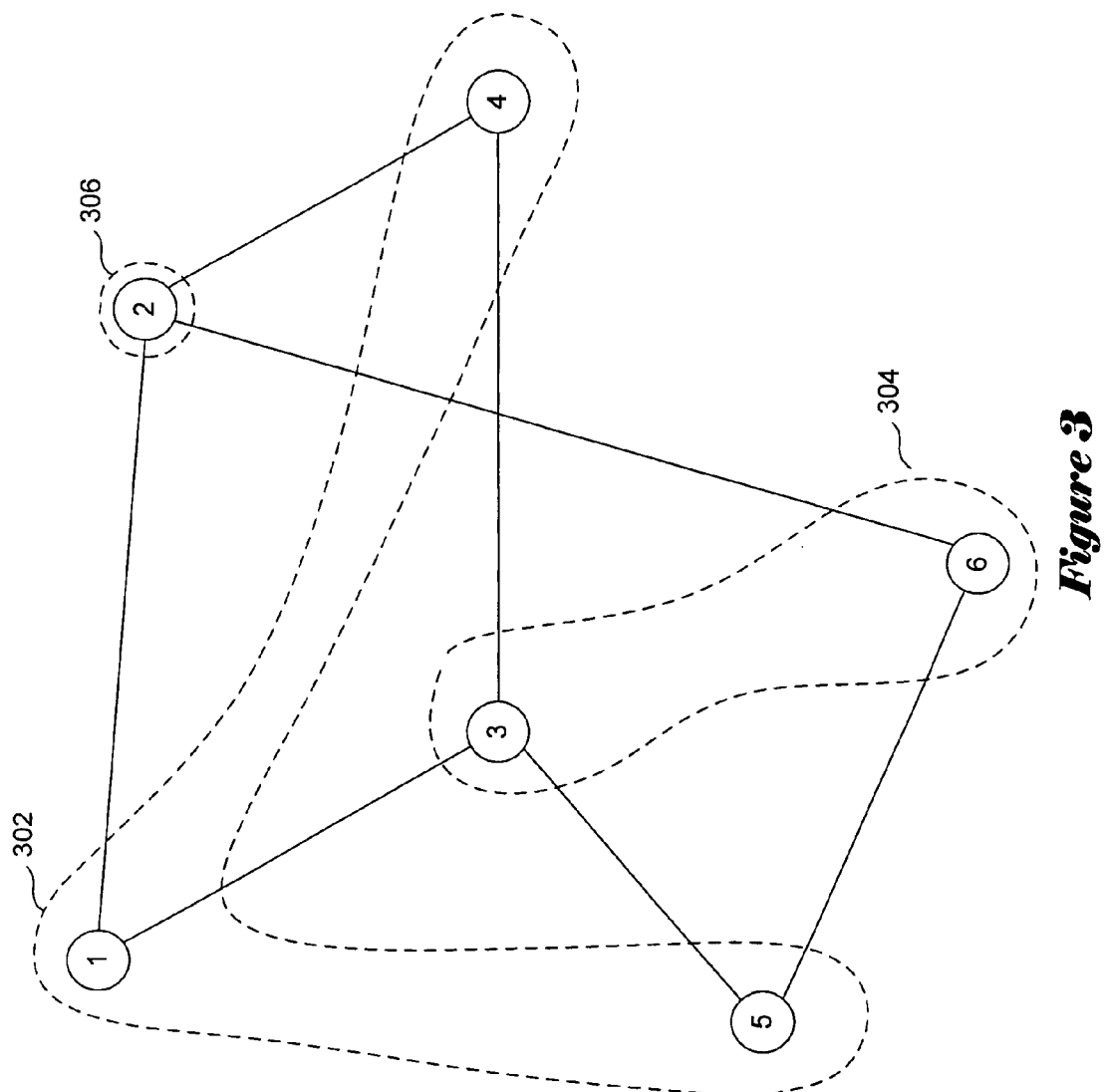
Figure 4:
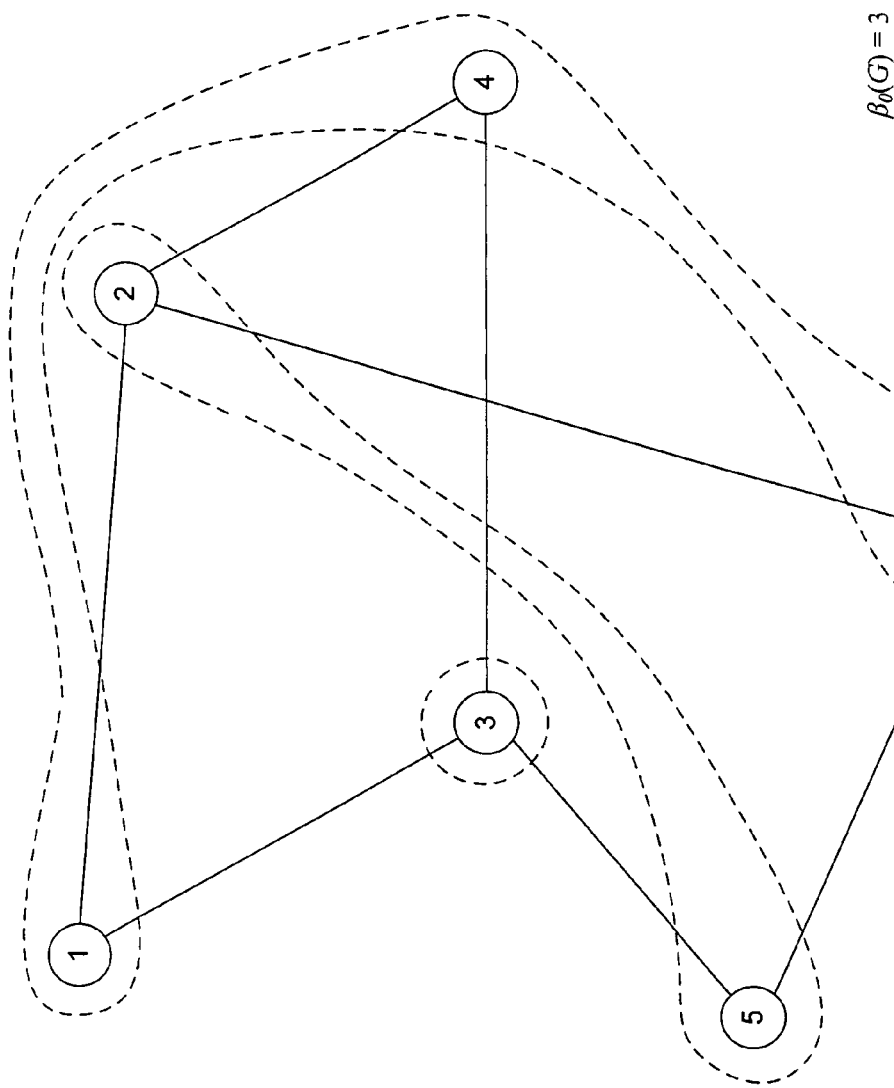

FIGS. 2-4 illustrate various characteristics of graphs using the graph G shown in FIG. 1. The degree of a vertex is the number of edges emanating from the vertex. In FIG. 2, each vertex of the graph G is labeled with the degree of the vertex. For example, the degree of vertex 2 103 is three. The minimum degree of any of the vertices in graph G, denoted as $\delta(G)$, is two, and the maximum degree of any of the vertices in G, designated $\Delta(G)$, is three.

An independent subset of V is a subset of vertices of a graph, each of which is not connected to other vertices of the subset by an edge. FIG. 3 shows the vertices of the graph G grouped into three independent subsets, indicated in FIG. 3 by dashed lines. One independent subset 302 includes the vertices 1, 4, and 5. A second independent subset 304 includes the vertices 3 and 6, and a third independent subset of vertices 306 includes the single vertex 2. In general, the vertices of a graph may be partitioned into many different independent subsets. For example, FIG. 4 shows a different partitioning of the vertices of graph G into three independent subsets. The size of the largest independent subset of vertices in graph G, or, in other words, the cardinality of the largest independent subset of vertices in graph G, is denoted as $\beta_0(G)$. The maximum size of any independent subset of vertices in the graph G shown in FIGS. 1-4 is three. Adding another vertex, or node, to any independent subset of vertices of cardinality 3 in graph G produces a subset with at least two nodes connected by an edge.

A graph is referred to as k-partite when the vertices of the graph can be partitioned into k independent subsets of vertices. Graph G shown in FIGS. 1-4 can be trivially seen to be 6-partite, since each of the six vertices can be assigned to a different, independent subset of vertices each including a single vertex. Graph G is also 5-partite, 4-partite, and 3-partite, but the vertices of graph G cannot be partitioned into only two independent subsets of vertices, and is therefore not bipartite. The minimum k for which $$V = \bigcup_{i=1 \text{ to } k} V_i$$

$V_i$, where each $V_i$ is an independent set of vertices of the set of vertices V of a graph, is referred to as the chromatic number of the graph, denoted, for graph G, $\chi(G)$. The chromatic number is the minimum number of colors that can be used to color the vertices of a graph so that no two vertices with the same color are joined by a single edge.

Figure 5:
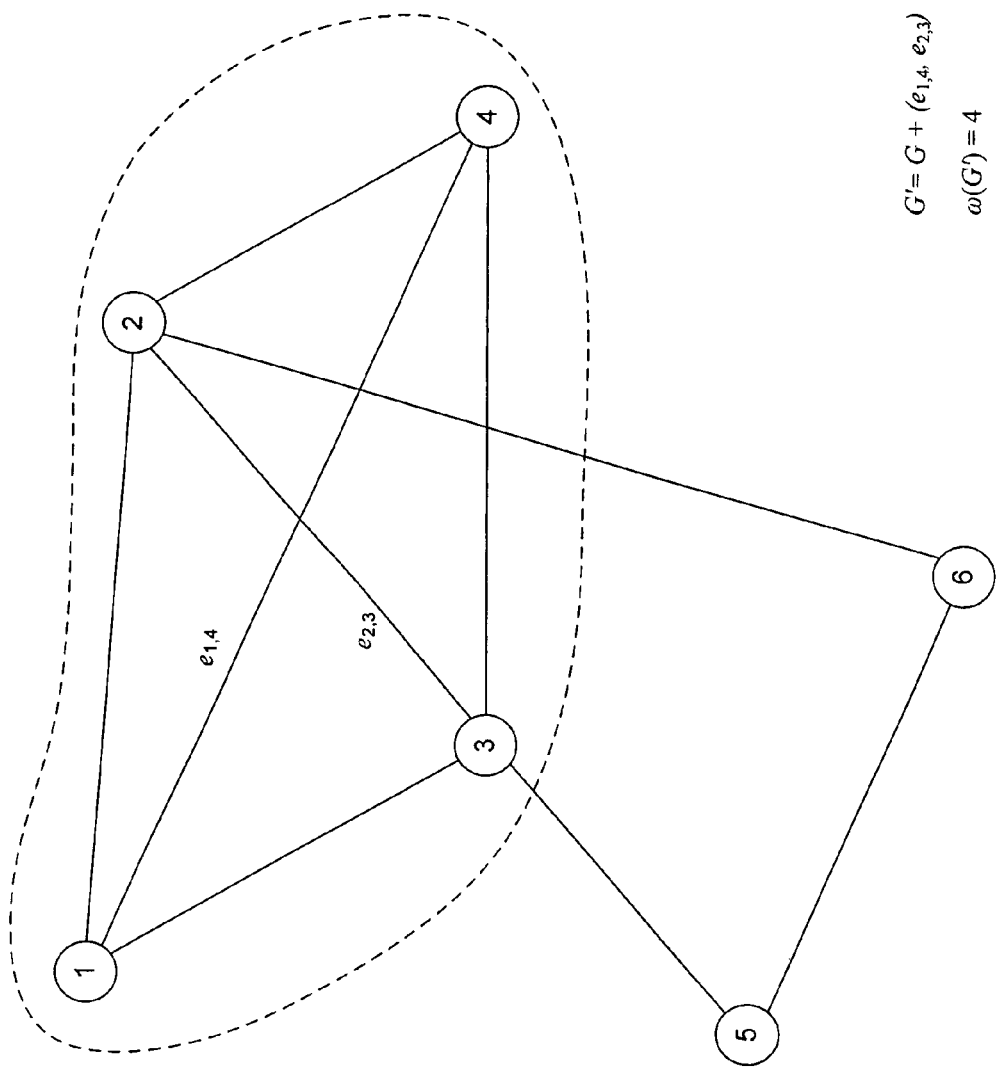
FIG. 5 shows a graph G' derived from the graph G shown in FIGS. 1-4 by addition of two new edges.

FIG. 5 shows a graph G' derived from the graph G shown in FIGS. 1-4 by addition of two new edges. Two edges $e_{1,4}$ and $e_{2,3}$ have been added to graph G to create graph G' in order to illustrate the concept of a clique. A clique is a subset of vertices within a graph that are fully interconnected by edges. In graph G' shown in FIG. 5, vertices 1, 2, 3, and 4 are fully connected, since there is an edge interconnecting each possible pair of vertices selected from the subset of vertices $\{1,2,3,4\}$. The clique number of a graph, denoted $\omega(G)$, is the cardinality of the largest clique in the graph. The cardinality of graph G' shown in FIG. 5, $\omega(G')$, is 4, since the above-described clique is the largest clique within graph G'.

Figure 6:
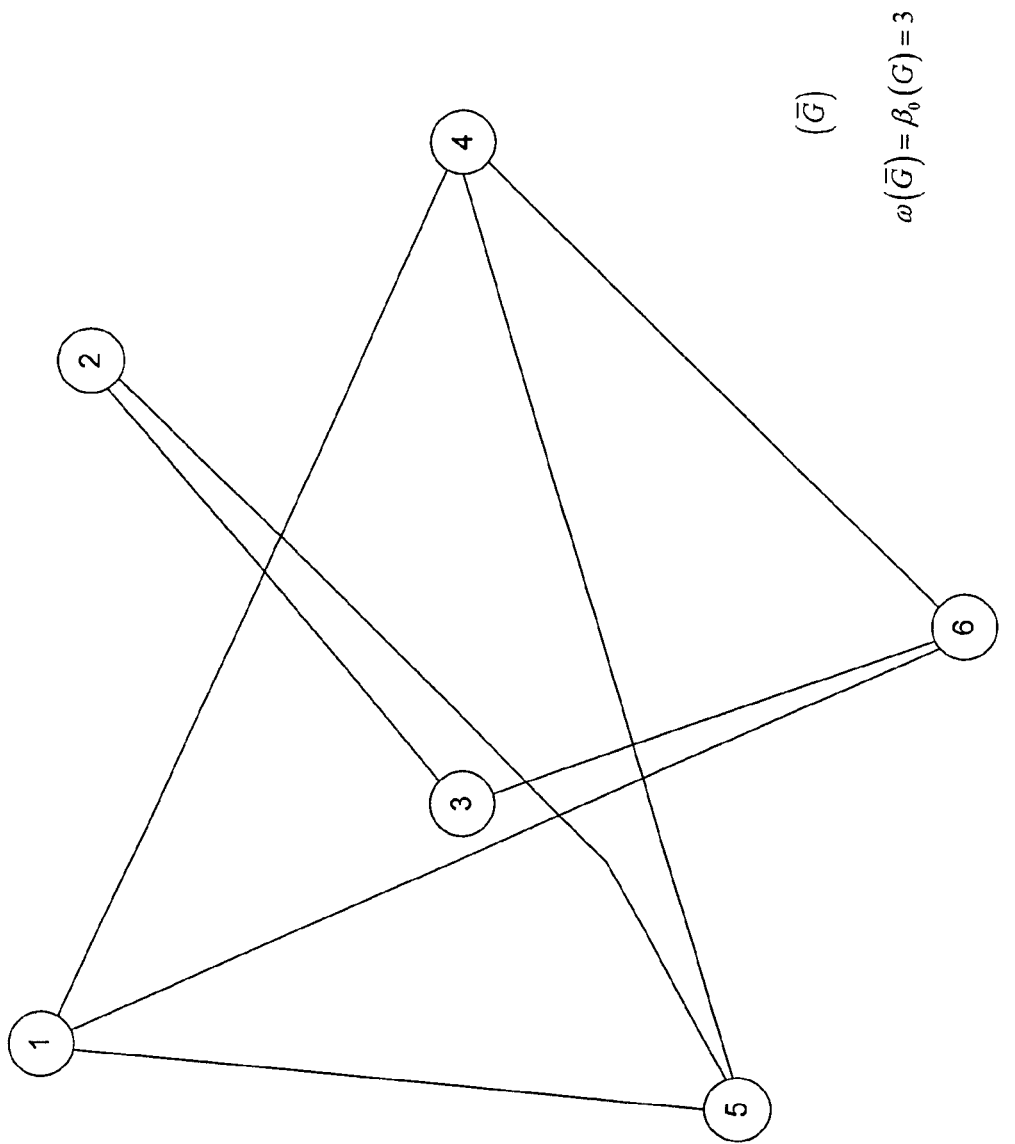
FIG. 6 shows the complementary graph of graph G.

FIG. 6 shows the complementary graph of graph G. The complementary graph of graph G is denoted $\overline{G}$. The complementary graph $\overline{G}$ has edges connecting vertices unconnected in G and lacks the edges present in graph G. The clique number of the complementary graph of graph G, $\omega(\overline{G})$, is equal to the cardinality of the maximum independent subset of graph G, $\beta_0(G)$. The cardinality of the largest independent subset of vertices in graph G s is three, and thus the clique number of the complement of graph G, $\overline{G}$, is also three. One clique with cardinality 3 consists of the set of vertices $\{1,4,6\}$.

Figure 7:
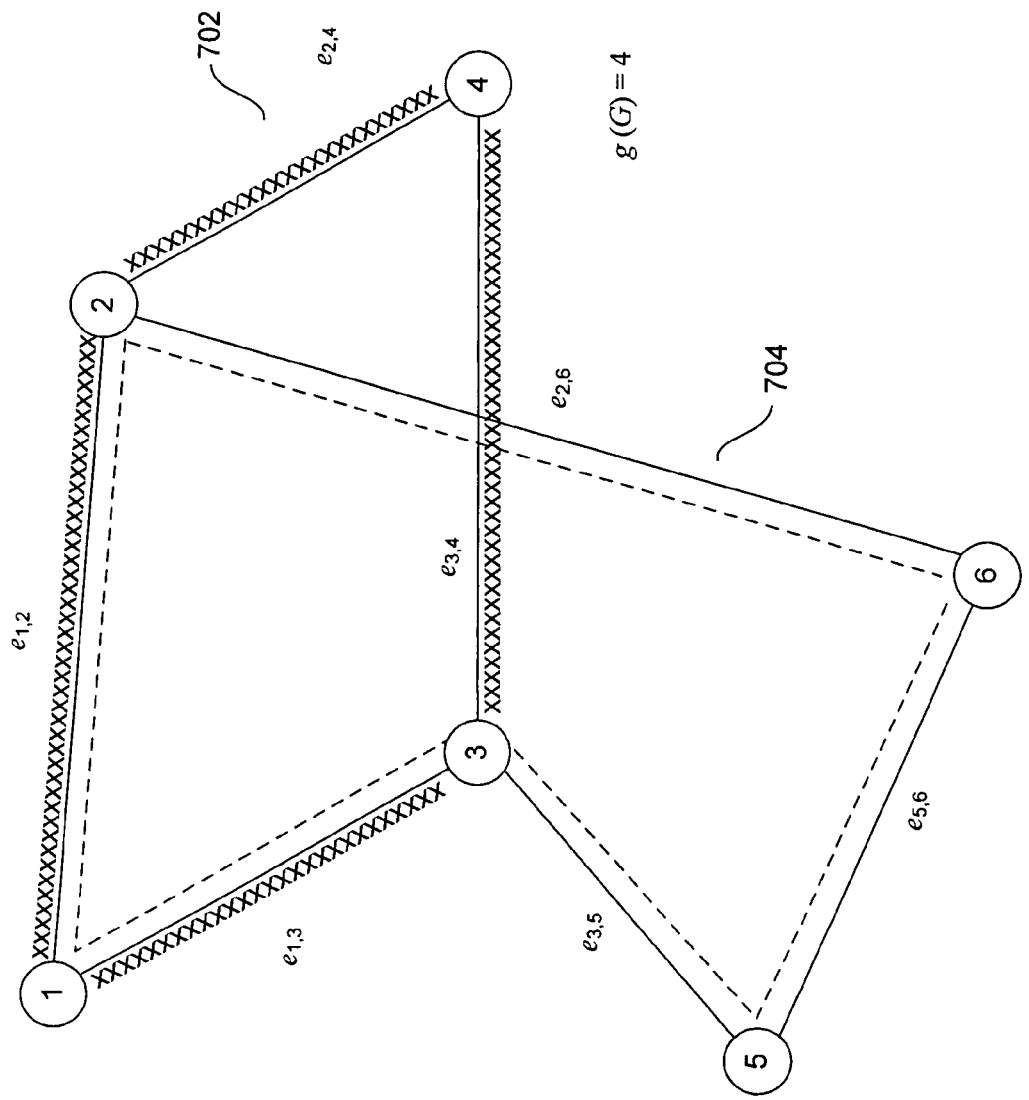
FIG. 7 illustrates two different cycles within the graph G shown in FIGS. 1-4.

Each edge of a pair of adjacent edges shares a common vertex. A cycle within a graph is a sequence of adjacent edges that begins and ends at one, particular vertex. FIG. 7 illustrates two different cycles within the graph G shown in FIGS. 1-4. The first cycle 702, denoted by a series of small "x" symbols along the edges of the cycle, comprises the set of edges $\{e_{1,2}, e_{2,4}, e_{3,4}, \text{ and } e_{1,3}\}$. A second cycle 704, denoted by a series of small "–" symbols along the edges of the cycle, comprises the set of edges $\{e_{1,2}, e_{2,6}, e_{5,6}, e_{3,5}, \text{ and } e_{1,3}\}$. A cycle of three edges is referred to as a "triangle." The girth of a graph, denoted as g(G) for graph G, is the length, in edges, of the shortest cycle within the graph. The girth of graph G shown in FIGS. 1-4 and 7 is four, since graph G has two cycles of length 5 and one cycle of length 4.

Figure 8:
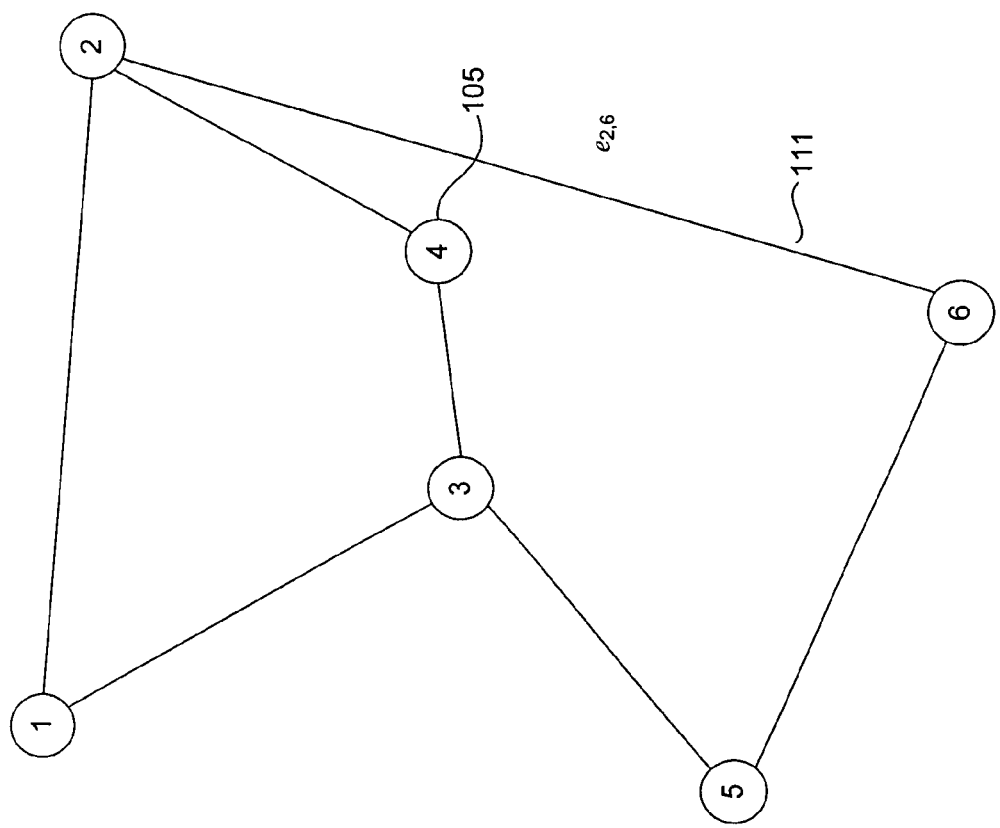
FIG. 8 shows an alternative illustration of the graph G shown in FIGS. 1-4 and 7.

A complete graph on p vertices is denoted by $K_p$, and the complete bipartite graph on independent sets of p and q vertices is denoted by $K_{p,q}$. FIG. 8 shows an alternative illustration of the graph G shown in FIGS. 1-4 and 7. In FIG. 8, vertex 4 105 has been moved leftward to the left-hand side of edge $e_{2,6}$ 111. In the alternative representation shown in FIG. 8, no pair of edges crosses over one another. A graph that can be drawn so that no pair of edges crosses over one another, such as graph G, is referred to as a planar graph. A graph can be colored by assigning one of a number of colors, or values, to each node within the graph. A graph is perfectly colored by n colors when, after assigning colors to each vertex in the graph, no single edge connects two vertices having the same color. A graph that is perfectly colored by n vertices is n-partite. The term "edge contraction" refers to combining two adjacent nodes into a single node, and removing the edge that originally connected the two combined nodes.

A few of the many graph theorems are next provided as a foundation for subsequent descriptions of method and system embodiments of the present invention:

Theorem 1. If $\Delta(G) \geq 2$, then $\chi(G) = \Delta G$ unless
  (1) $\Delta(G) = 2$ and G contains a cycle of odd length; or
  $\Delta(2)$ $\Delta(G) > 2$ and G contains a clique of size $\Delta(G)+1$.

Theorem 2. A graph is bipartite if and only if it has no cycles of odd length.

Theorem 3. For any positive integers h and k, there exists a graph with $g(G) \geq h$ and $\chi(G) \geq k$.

Theorem 4. A finite graph G is planar if and only if it has no subgraph that is edge-contractable to $K_5$ or $K_{3,3}$.

Theorem 5. Every planar graph can be perfectly colored with 4 colors. Equivalently, $\chi(G) \leq 4$ for every planar graph.

Theorem 6. $\chi(G) = 3$ for every planar graph without four triangles.

Theorem 7. Consider the function $f$ from graphs to integers such that $f(G)$ is the maximum number of edges among all the bipartite subgraphs of G. Then $$f(G) > \frac{|E|}{2}.$$

Theorem 8. Consider the function h from integers to integers such that h(e) is the largest integer having the property that every graph with e edges has a bipartite subgraph with at least h(e) edges. Then $$h(e) \geq \frac{e}{2} + \frac{-1 + \sqrt{8e+1}}{8}$$

Theorem 9. A triangle-free graph of n vertices and e edges can be made bipartite by removing at most $$\text{Min}\left\{ \frac{e}{2} - \frac{(2e(2e^2 - n^3))}{n^2(n^2 - 2e)}, e - \frac{4e^2}{n^2} \right\}$$

edges.

Theorem 10. Every graph has a bipartite subgraph on half of its vertices.

Theorem 11. Consider the function $f$ from graphs to integers such that $f(G)$ is the maximum number of edges among all of the bipartite subgraphs of G. If G is a triangle-free graph with e edges on n vertices with degrees $\{d_i\}_{i=1,\ldots,n}$, then $$f(G) > \frac{e}{2} + \frac{1}{8\sqrt{2}} \sum_{i=1}^n \sqrt{d_i}$$

RFID Tags and RFID-Tag Readers

Figure 9:
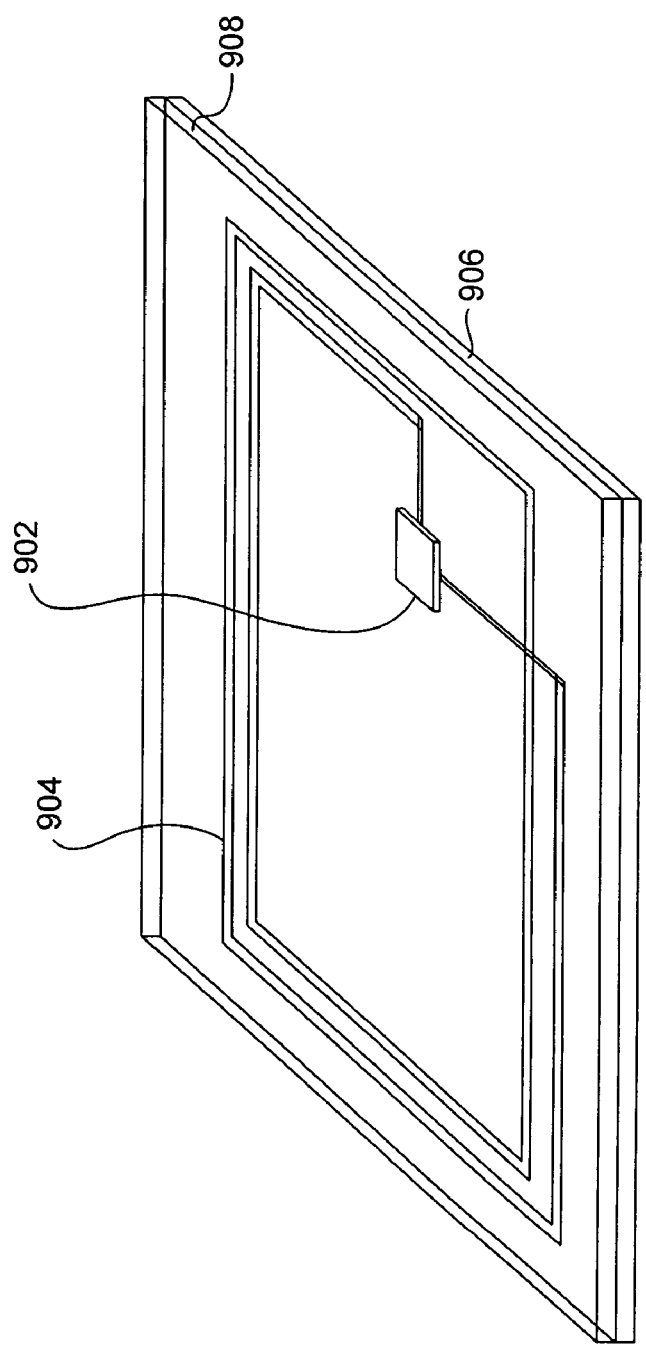
FIG. 9 illustrates the basic components of a passive RFID tag.

There are many different types of RFID tags and RFID readers. FIG. 9 illustrates the basic components of a passive RFID tag. A passive RFID tag may include an integrated circuit ("IC") 902, or chip, and an antenna 904, both affixed to a substrate 906 and covered by a film or coating 908. The IC includes logic circuitry, power-harvesting circuitry, and memory, and the antenna 904 receives an RF carrier signal from an RFID-tag reader that is used by the passive RFID tag for power, for an internal clock signal, and as a communications medium for returning data stored in the RFID tag to the RFID-tag reader. Passive RFID tags do not contain batteries, capacitors, or other stored energy sources, but instead harvest all the power needed to power the IC from the RF carrier signal. Semi-passive RFID tags include batteries to power the IC, but use the RF carrier signal from an RFID-tag reader for transmission of data. Active RFID tags include batteries and transmitters for transmitting data back to RFID-tag readers.

Figure 10:
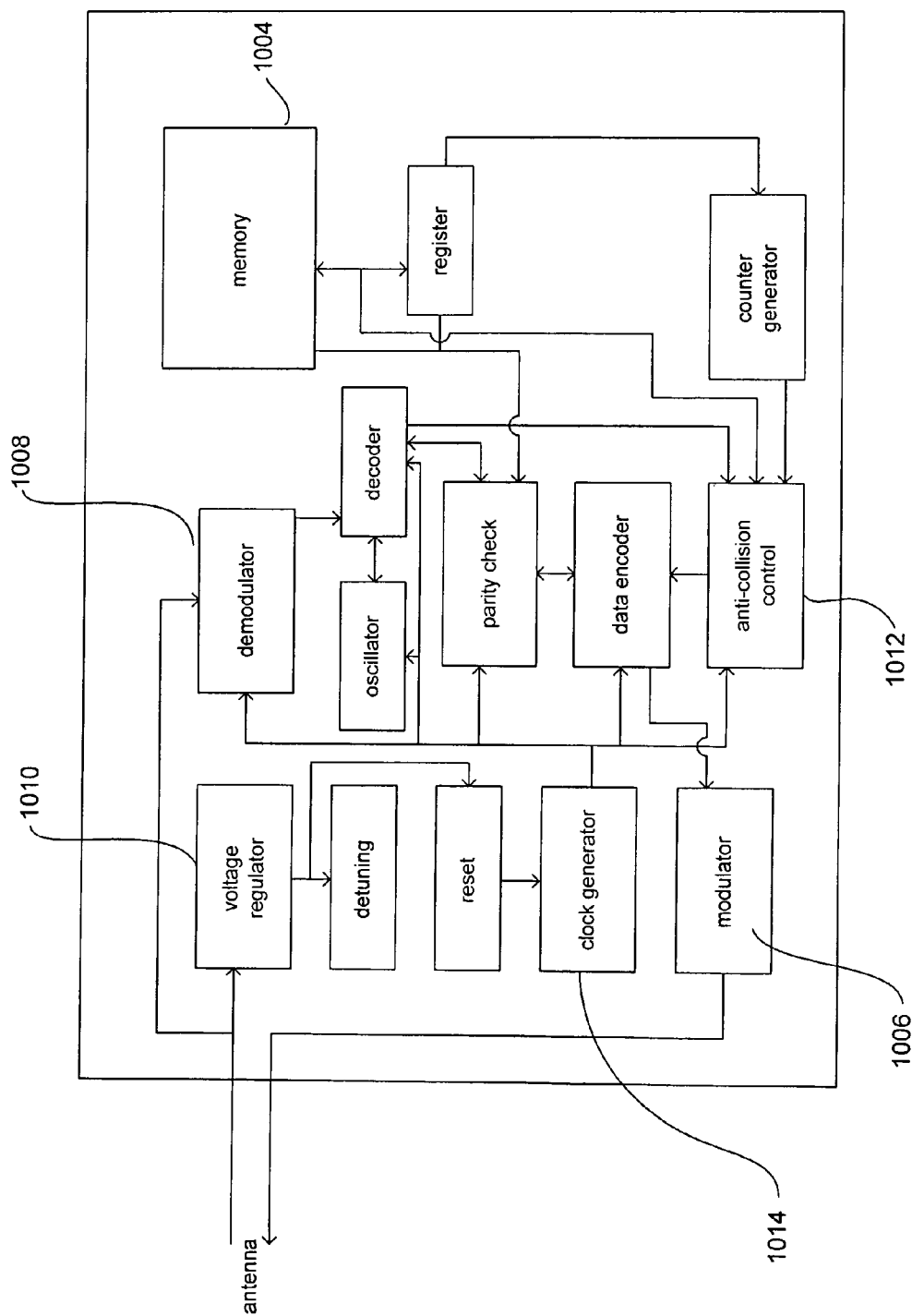
FIG. 10 illustrates the circuit modules fabricated within the IC of an exemplary passive-RFID-tag IC.

FIG. 10 illustrates the circuit modules fabricated within the IC of an exemplary passive-RFID-tag IC. The RFID-tag IC includes a very small memory 1004, such as an electronically erasable and programmable read-only memory ("EEPROM") capable of storing 96 bits, 1024 bits, or a greater number of bits of information. In general, the memory stores a digitally-encoded identifier, such as a product code and serial number, or other such information appropriate for the application in which the RFID tag is used. The RFID tag receives and transmits information by detecting modulation of, and generating modulation of, the received RF carrier signal. Thus, the IC includes both a modulator 1006 and demodulator, for transmitting and receiving information, respectively, on the RF carrier signal. As mentioned above, the RFID-tag IC is powered by energy extracted from the RF carrier signal, and therefore includes power extraction, regulation, and rectifying components, such as voltage regulator 1010. The RFID tag also includes circuitry that implements an anti-collision strategy 1012 that is discussed in greater detail below. In addition to receiving data and power from the RF carrier signal, the RFID tag also divides the RF carrier-signal frequency in order to generate a clock signal, by a clock-generator component 1014, that is used to control and synchronize the IC components. RFID-tag readers include complementary features and components for generating the RF carrier signal and for detecting modulation of the RF carrier signal in order to receive information from RFID tags within range of the RFID-tag reader.

Figure 11:
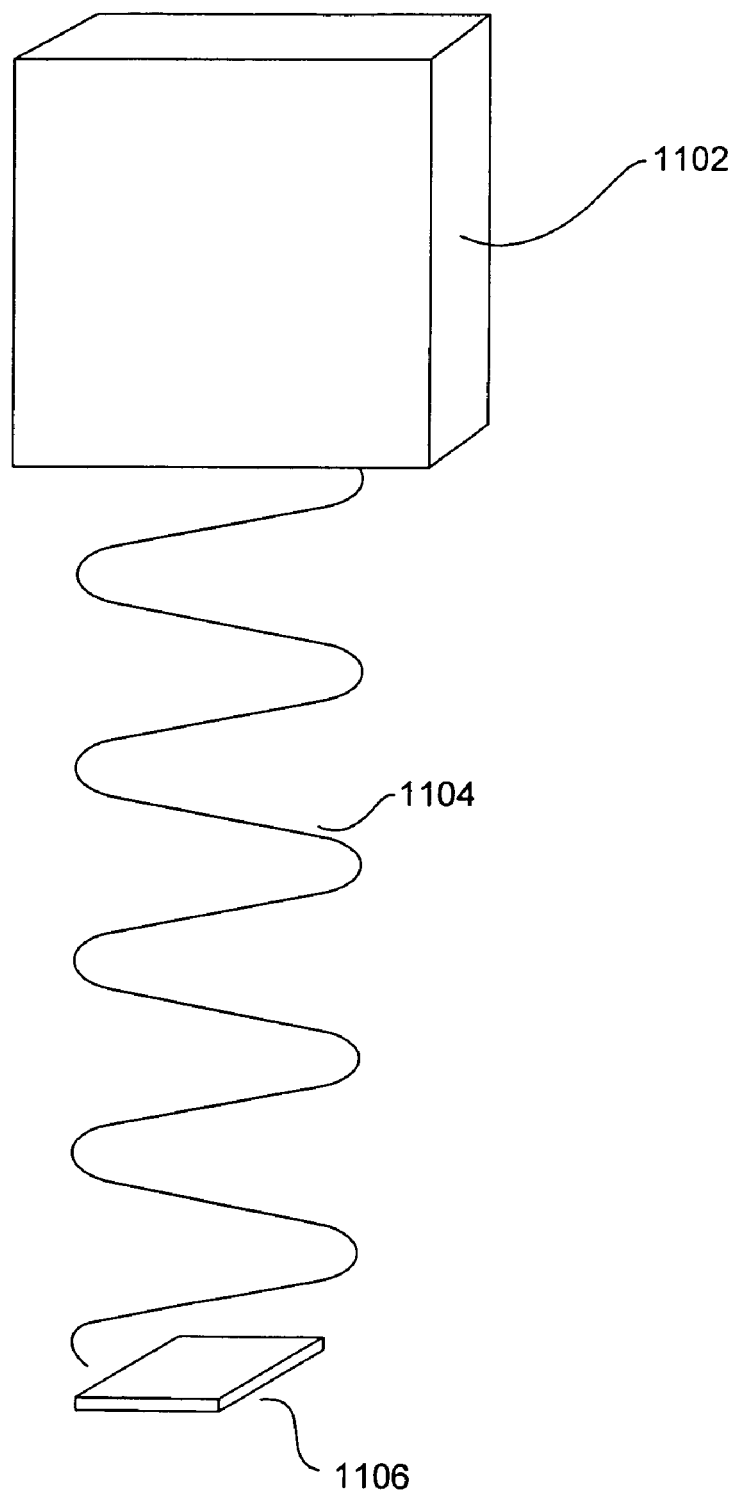
FIGS. 11-13C illustrate the basic operation of an RFID tag and RFID-tag reader.
Figure 12:
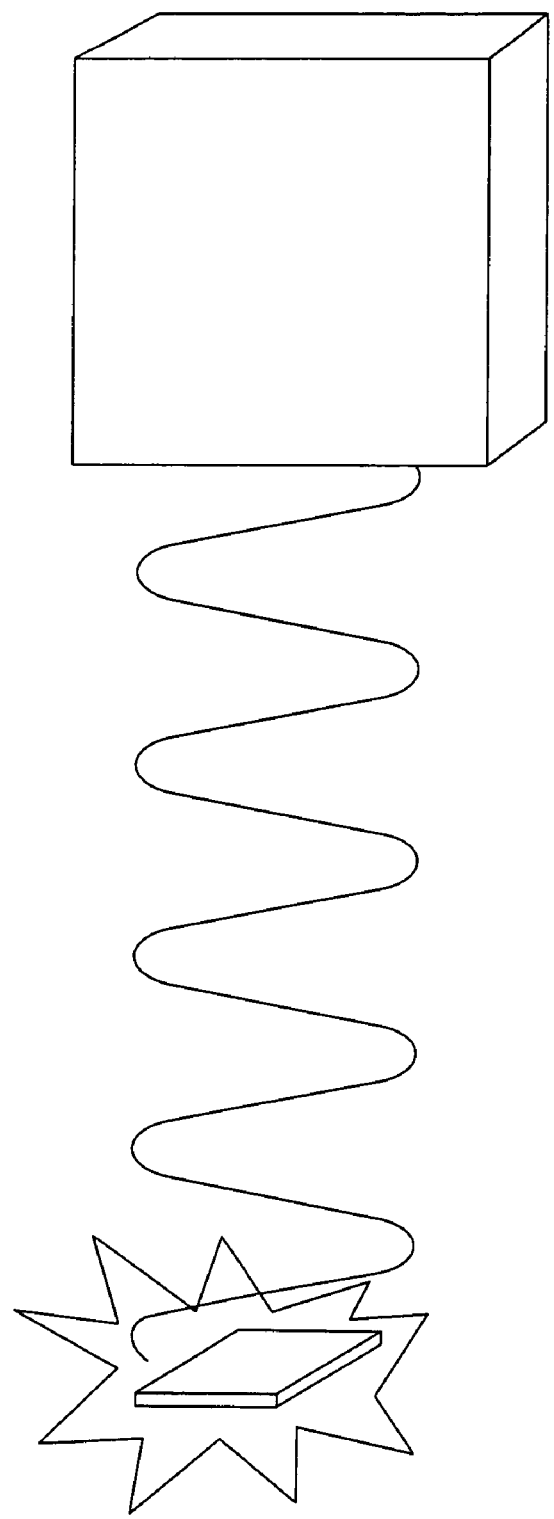

FIGS. 11-13C illustrate the basic operation of an RFID tag and RFID-tag reader. First, as shown in FIG. 11, an RFID-tag reader 1102 transmits an RF carrier signal 1104 to a surrounding region that includes an RFID tag 1106. When the RFID tag is close enough to the RFID-tag reader, or, in other words, within the field of the RFID-tag reader, and when the RFID tag is oriented so that the antenna of the RFID tag can extract sufficient energy from the RF carrier signal, as shown in FIG. 12, then the RFID tag generates sufficient current to operate the RFID-tag IC. Once energized, the RFID tag extracts information from the RFID-tag memory and transmits the information back to the RFID-tag reader by modulating the RF carrier signal generated by the RFID-tag reader.

Figure 13A:
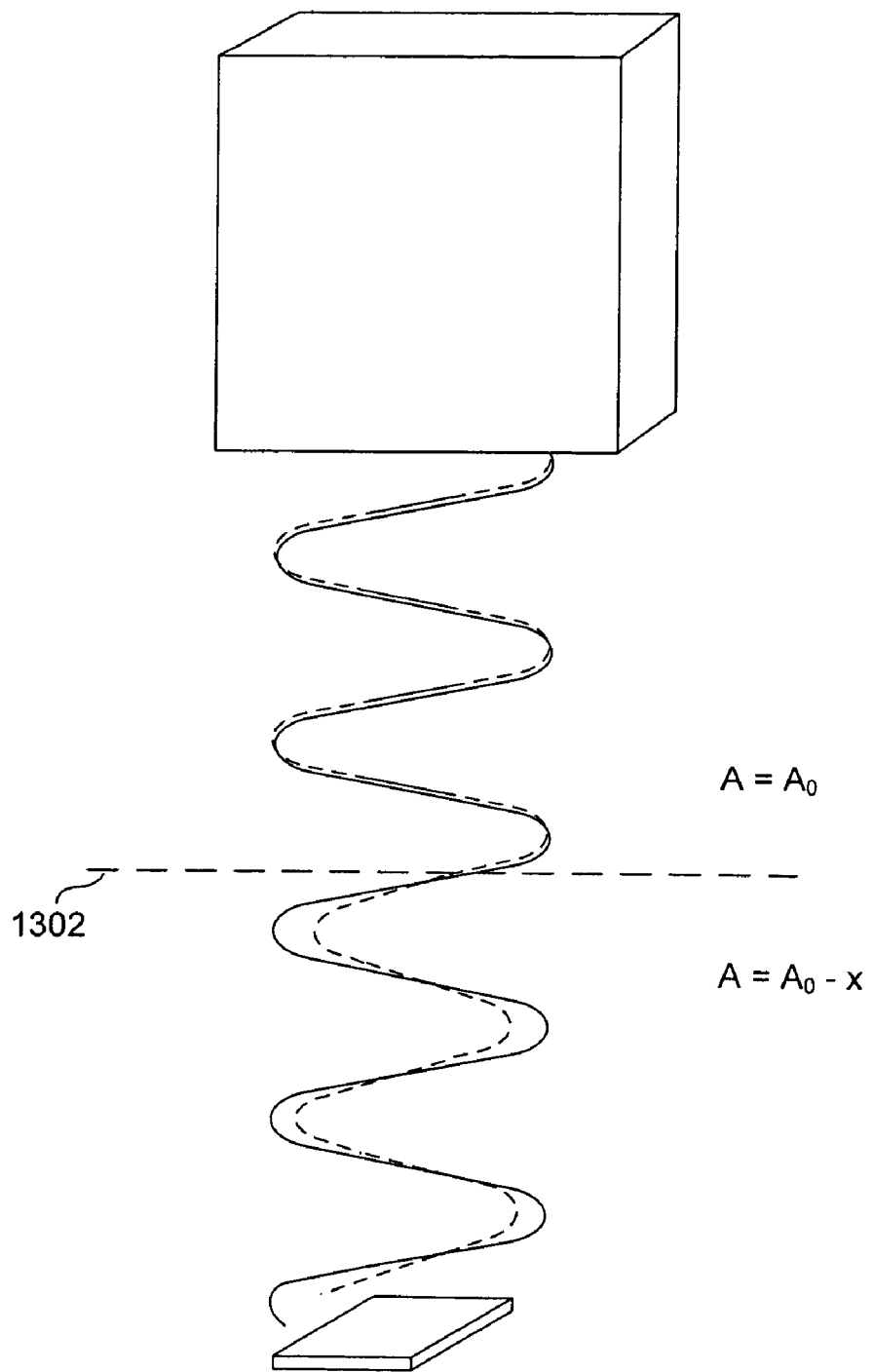
Figure 13B:
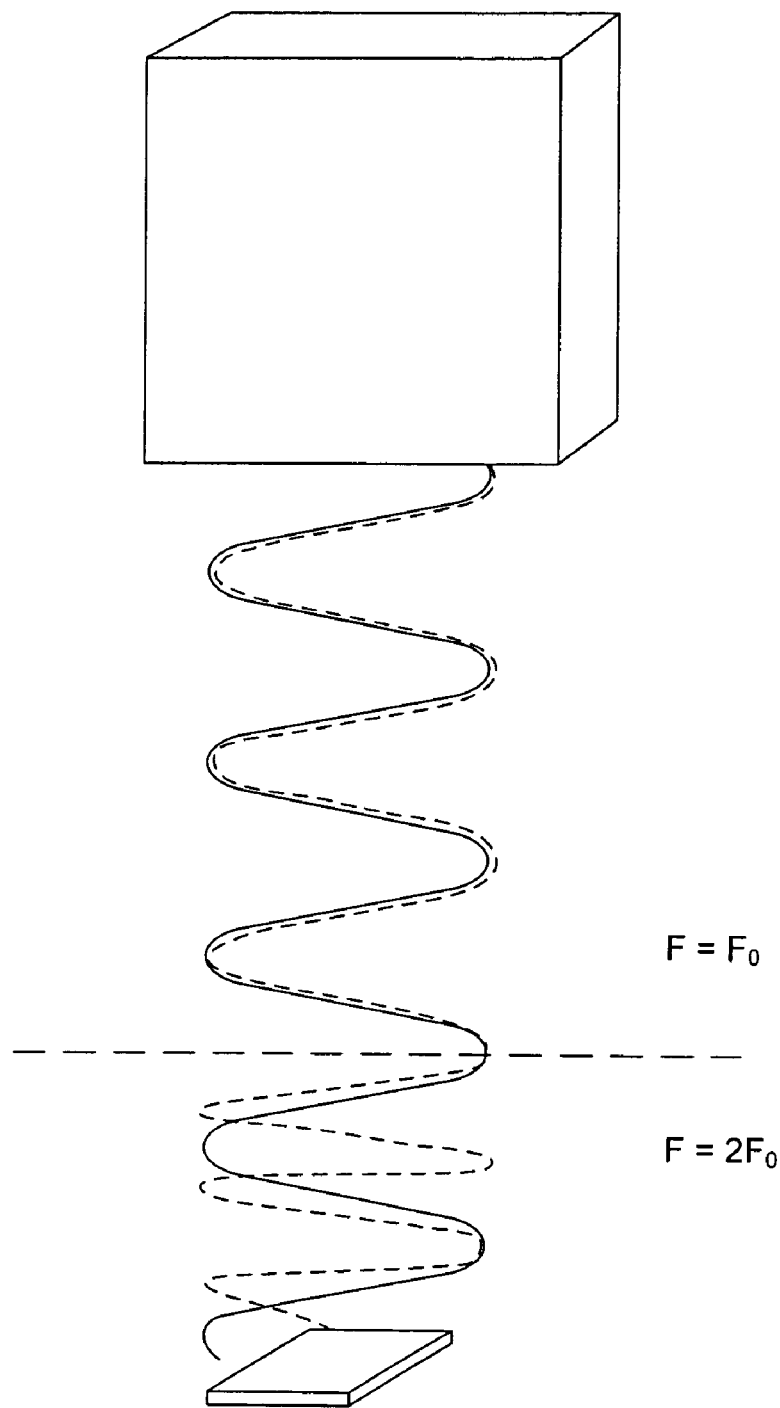
Figure 13C:
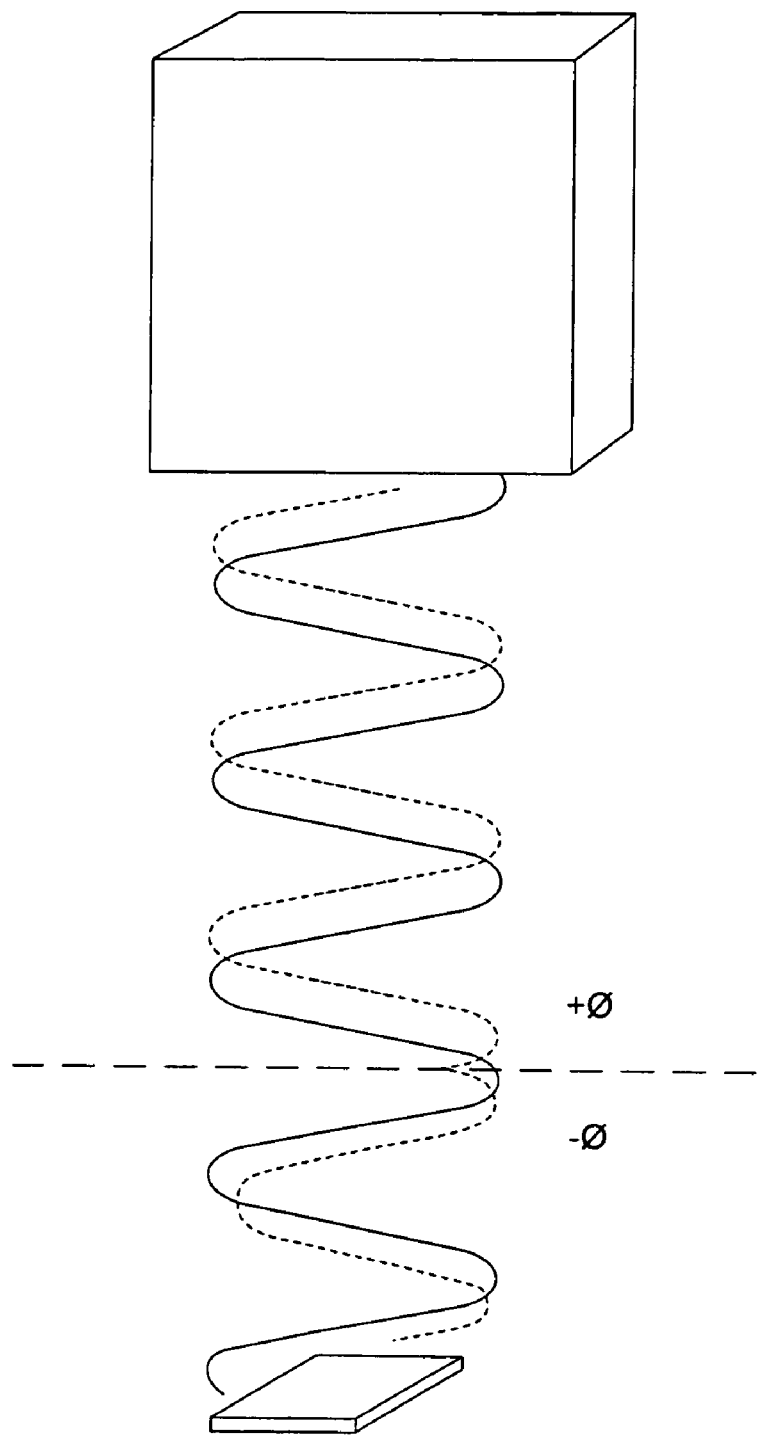

FIG. 13A-C illustrate three of various types of carrier-signal modulation employed by RFID tags. In a first modulation technique, illustrated in FIG. 13A, the RFID tag modulates the amplitude of the RF carrier signal, at discrete intervals of time, to generate a binary-encoded RF-carrier-signal modulation that can be detected and read by the RFID-tag reader. For example, unmodulated RF-carrier signal, above the dashed line 1302 in FIG. 13A, may correspond to a binary "0" value, while modulated RF-carrier signal, below the dashed line 1302 in FIG. 13A, may correspond to a binary "1" value. The RFID tag can modulate the amplitude of the RF carrier signal by shunting the antenna to remove energy from the RF carrier signal. The RFID-tag reader detects the presence or absence of amplitude modification at discrete intervals of time, and translates the modulation into a digital, binary signal. As shown in FIG. 13B, the RFID tag may modulate the RF carrier signal by changing the frequency of the RF carrier signal, and as shown in FIG. 13C, the RFID tag may alternatively modulate the RF carrier signal by changing the phase of the RF carrier signal. A variety of different types of data encodings can be employed by RFID tags and RFID tag readers, including direct encodings, differential biphase encodings, Manchester encodings, and other encodings. When the RFID-tag reader successfully receives the digitally encoded data transmitted by the RFID tag, the RFID tag has been successfully read.

As mentioned above, RFID tags are employed to associate physical objects with digitally encoded information in a variety of different settings and applications. It is a common practice to inject tiny RFID tags into laboratory animals and pets to allow the laboratory animals and pets to be subsequently identified by reading digitally encoded animal identifications from the RFID tags. Many different types of products currently bear RFID tags to allow the products to be detected and monitored during shipment and to facilitate inventory control within distribution centers and retail establishments.

Figure 14:
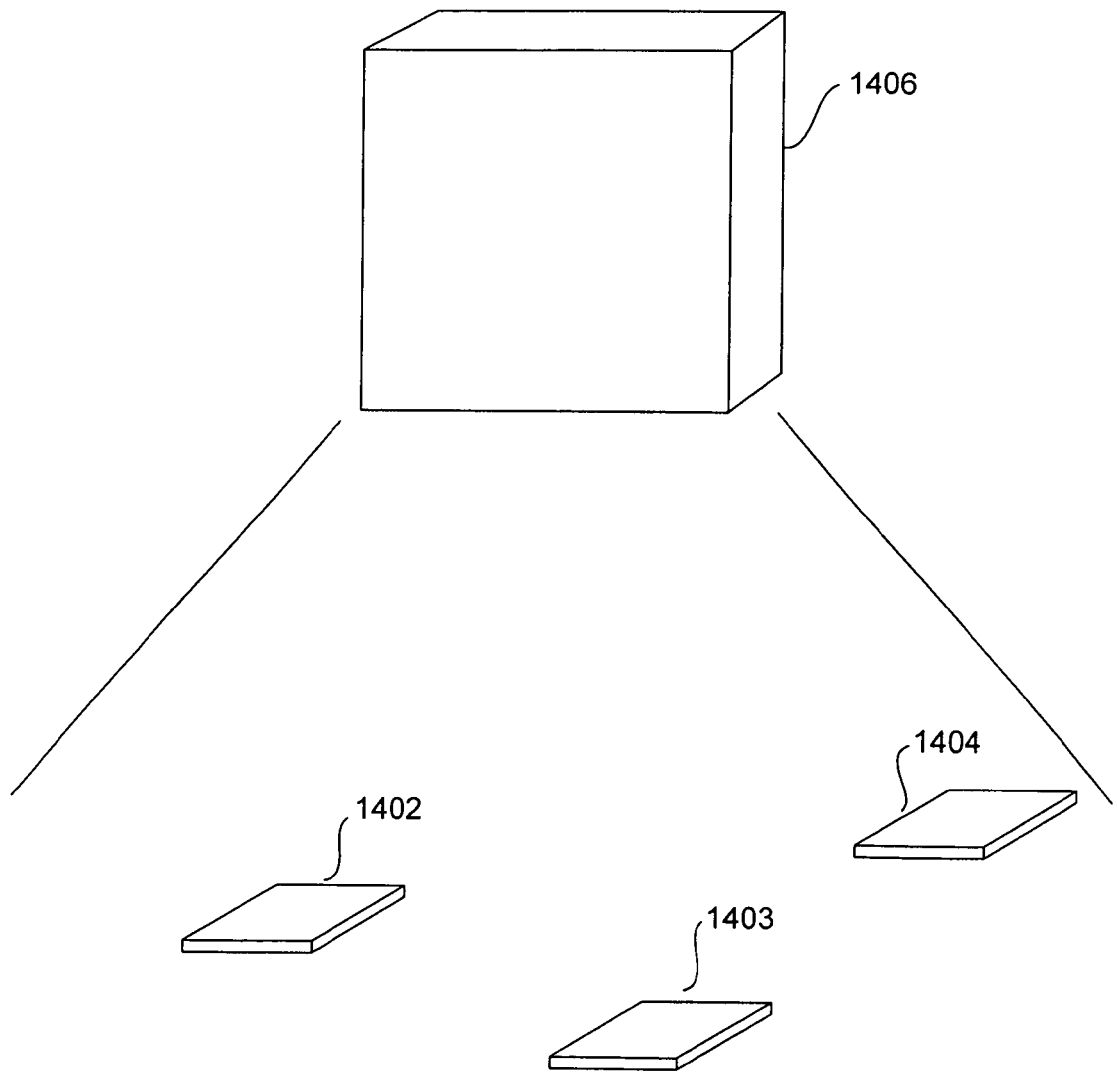
FIG. 14 illustrates a slightly more complex interaction in which a single RFID-tag reader interrogates multiple RFID tags within its range.
Figure 15:
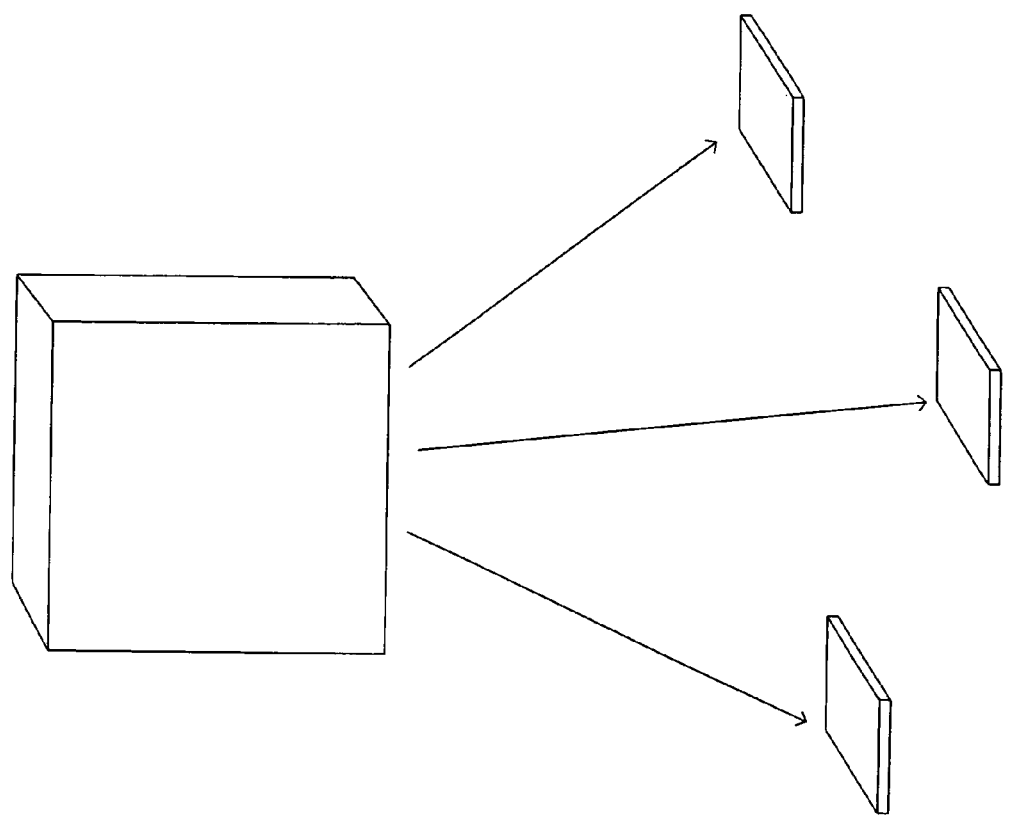
FIG. 15 shows the RFID-tag reader transmitting an RF carrier signal that is received by the multiple RFID tags within its range.
Figure 16:
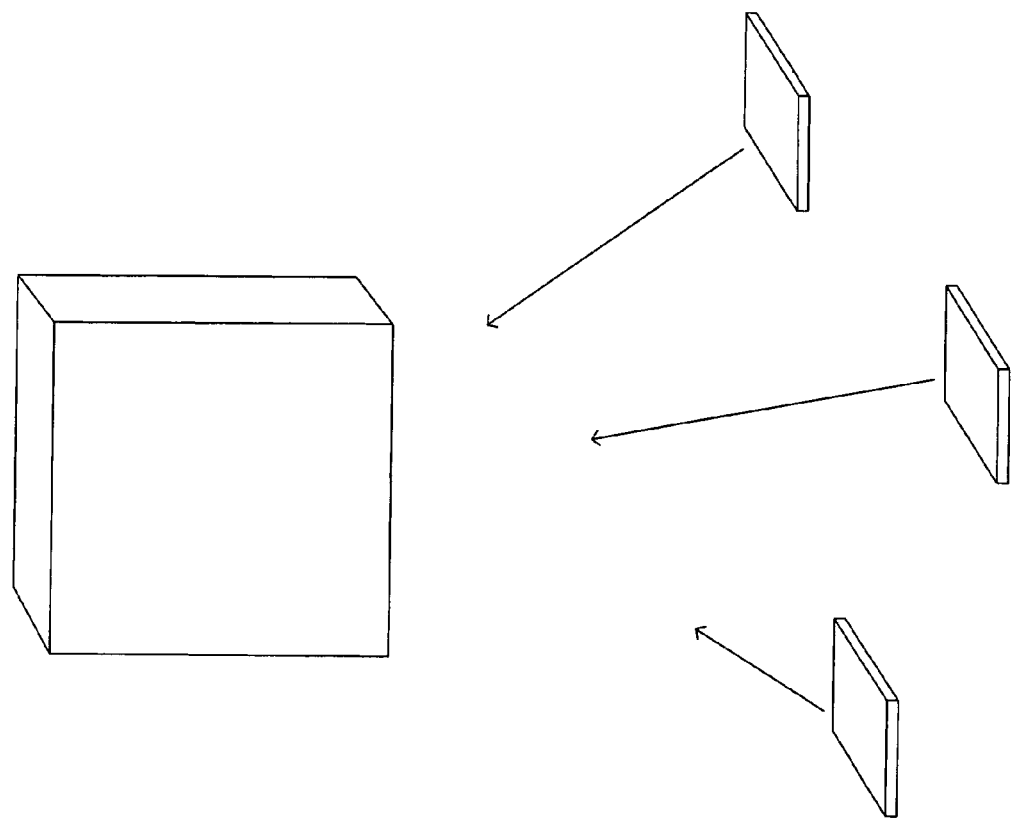
FIG. 16 shows the multiple RFID tags attempting to respond simultaneously to the detected RF carrier signal.

The simple interrogation sequence shown in FIGS. 11-13C, in which a single RFID-tag reader detects a single RFID tag within its environment, or range, represents probably the simplest RFID tag/RFID-tag reader interaction. FIG. 14 illustrates a slightly more complex interaction in which a single RFID-tag reader interrogates multiple RFID tags within its range. As shown in FIG. 14, three different RFID tags 1402-1404 are within the range, and properly oriented with respect to, a single RFID-tag reader 1406. When the RFID-tag reader sends out an RF carrier signal, as illustrated in FIG. 15, all three of the RFID tags within the range of, and properly oriented with respect to, the RFID-tag reader may attempt to respond to the detected RF carrier signal by modulating the RF carrier signal to transmit their stored information back to the RFID reader, as shown in FIG. 16. Unfortunately, when more than one RFID tag attempts to transmit information at a given point in time, the unsynchronized RFID-tag modulations of the RF carrier wave result in a garbled and undecipherable modulation-based signal that cannot be read by the RFID-tag reader.

Figure 17:
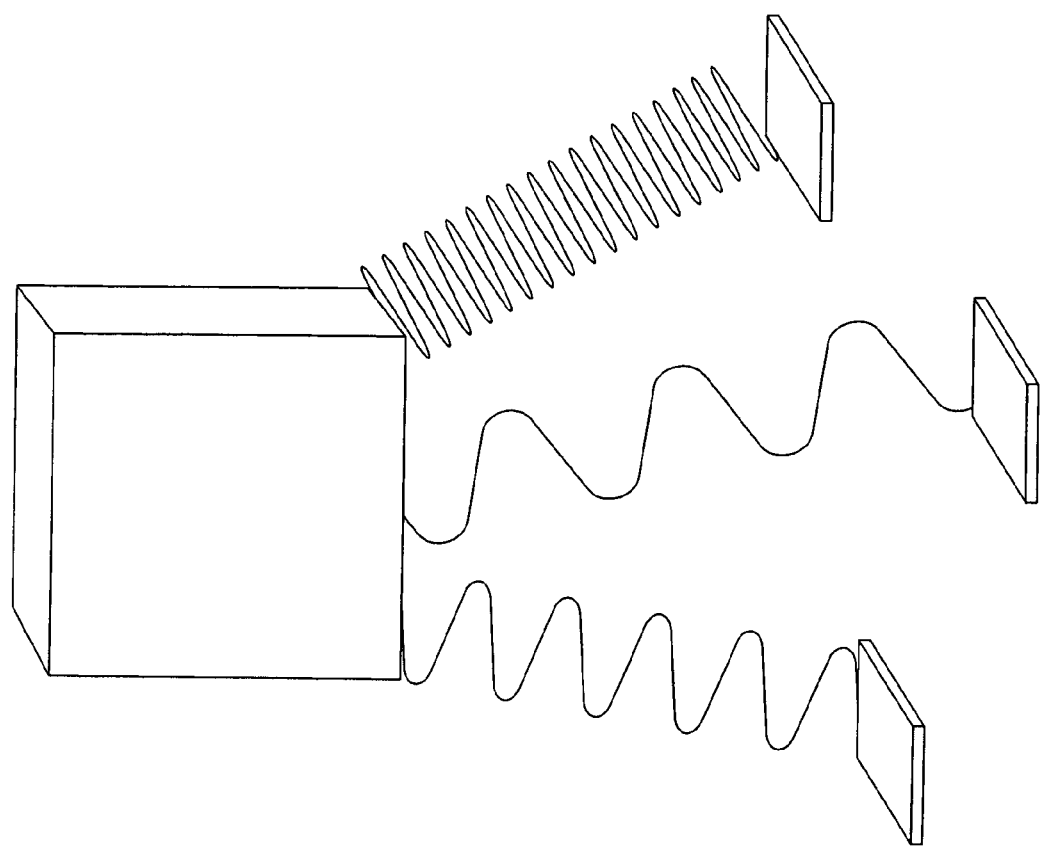
FIG. 17 shows the RFID-tag reader emitting multiple different RF carrier signals with different frequencies.

A number of different techniques are used to allow for successful interrogation, by an RFID-tag reader, of multiple RFID tags within its range. First, as shown in FIG. 17, the RFID-tag reader may emit multiple different RF carrier signals with different frequencies. RFID tags can be designed to each receive energy from, and respond to, one of a number of different RF carrier frequencies. Providing that there are sufficient available RF carrier-signal frequencies so that each of the multiple RFID tags within an RFID-tag reader's field responds to a different RF carrier-signal frequency, then frequency-based multiplexing, as shown in FIG. 17, represents an effective approach to interrogation of multiple RFID tags within the range, or field, of an RFID-tag reader.

Figure 18B:
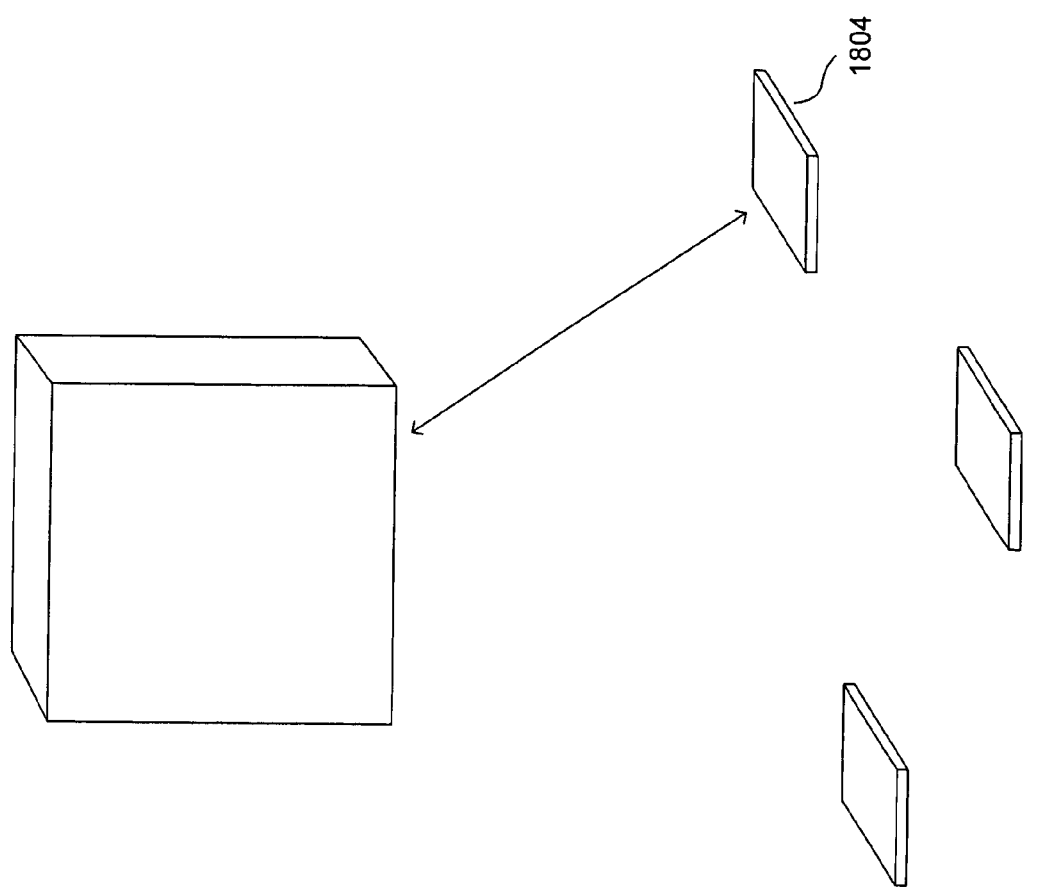
Figure 18C:
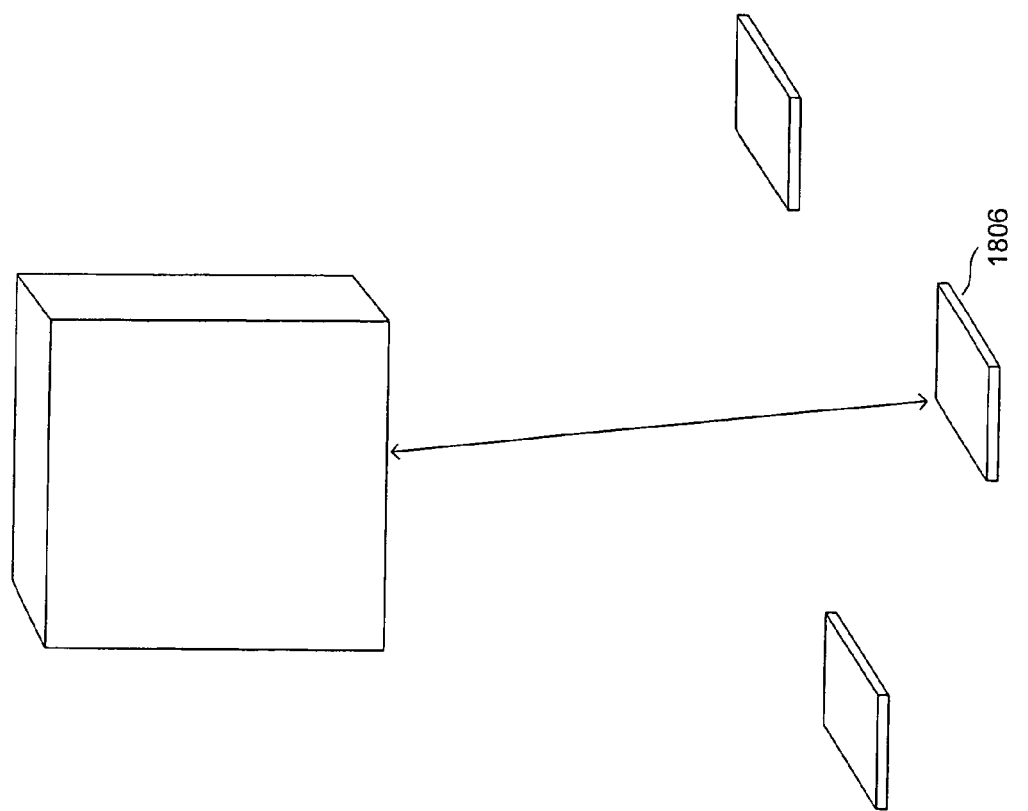

Another approach to interrogating multiple RFID tags within an RFID-tag reader's field is to use time-based multiplexing by RFID tags and RFID-tag readers. FIGS. 18A-C illustrate one time-based multiplexing technique that employs a collision-avoidance technique. Returning briefly to FIG. 16, in the case that multiple RFID tags that all respond to a single RF frequency attempt to respond simultaneously or concurrently to a detected RF carrier signal broadcast by an RFID-tag reader, the RFID tags, as well as the RFID-tag reader, can detect multiple, overlapping attempts to modulate the RF carrier signal, and the RFID tags can immediately cease transmitting information back to the RFID-tag reader. Each RFID tag then waits for a period of time determined by information stored within the RFID tag, and then again attempts to transmit information back to the RFID-tag reader. Different RFID tags wait for different periods of time before attempting retransmission as a result of the different back-off times stored in each of the RFID tags. Thus, in FIG. 18A, a first RFID tag 1802 with the shortest stored back-off time waits for that back-off time and then transmits the identification information stored within the RFID tag back to the RFID reader. Next, as shown in FIG. 18B, a second RFID tag 1804 with the second-longest stored back-off time completes waiting, and then transmits the information stored within the second RFID tag's memory back to the RFID tag reader. Finally, as shown in FIG. 18C, the RFID tag 1806 with the longest stored back-off time completes waiting, and then transmits the information stored within the third RFID tag's memory back to the RFID tag reader. Similar back-off algorithms are employed for collision avoidance in Ethernet local area networks and in various communication protocols.

Although frequency multiplexing and time-based multiplexing can be used to attempt to avoid simultaneous transmission by two or more RFID tags, or collisions, when multiple RFID tags are within the field of an RFID tag reader, a sufficient number of RFID tags within the field of an RFID-tag reader may overwhelm either approach and lead to collisions and failures to receive information by the RFID-tag reader from one or more RFID tags within the field. FIG. 19 shows a large number, 17, of different RFID tags within the field of, and properly oriented with respect to, a single RFID-tag reader. In the case shown in FIG. 19, if there are less than 17 available frequencies for frequency-based multiplexing, or less than 17 different back-off times available for time-based multiplexing, one or more collisions between transmitting RFID tags may occur. The problem may be exacerbated, in the case of time-based multiplexing, when the RFID tags are moving relative to the RFID-tag reader, so that the multiple RFID tags are present within the field of the RFID-tag reader for only a limited duration of time.

FIG. 20 illustrates an even more complex situation in which 17 different RFID tags are within the field of, and properly oriented with respect to, three different RFID-tag readers. Although complex protocols may be developed to extend time-based multiplexing, frequency-based multiplexing, or other types of multiplexing to multiple RFID-tag reader/multiple RFID-tag situations such as that shown in FIG. 20, such techniques and protocols are not currently employed in the vast majority of RFID tags and RFID-tag readers. One significant problem is that the cost of individual RFID tags is often a significant bottleneck for commercial RFID-tag use. Only when RFID tags can be cheaply manufactured and used can the convenience and reliability of RFID-tag labeling be economically justified. Therefore, the bulk of RFID tags are simple, passive RFID tags without complex circuitry for complex collision-avoidance strategies that would effectively deal with multiple RFID-tag reader/RFID-tag situations such as that shown in FIG. 20. For this reason, manufacturers, vendors, and users of RFID-tag-based labeling have recognized the need for strategies by which collisions can be avoided in multiple RFID-tag-reader networks in which multiple RFID-tag readers attempt to interrogate expensive, single-frequency RFID tags.

EMBODIMENTS OF THE PRESENT INVENTION

Figure 21:
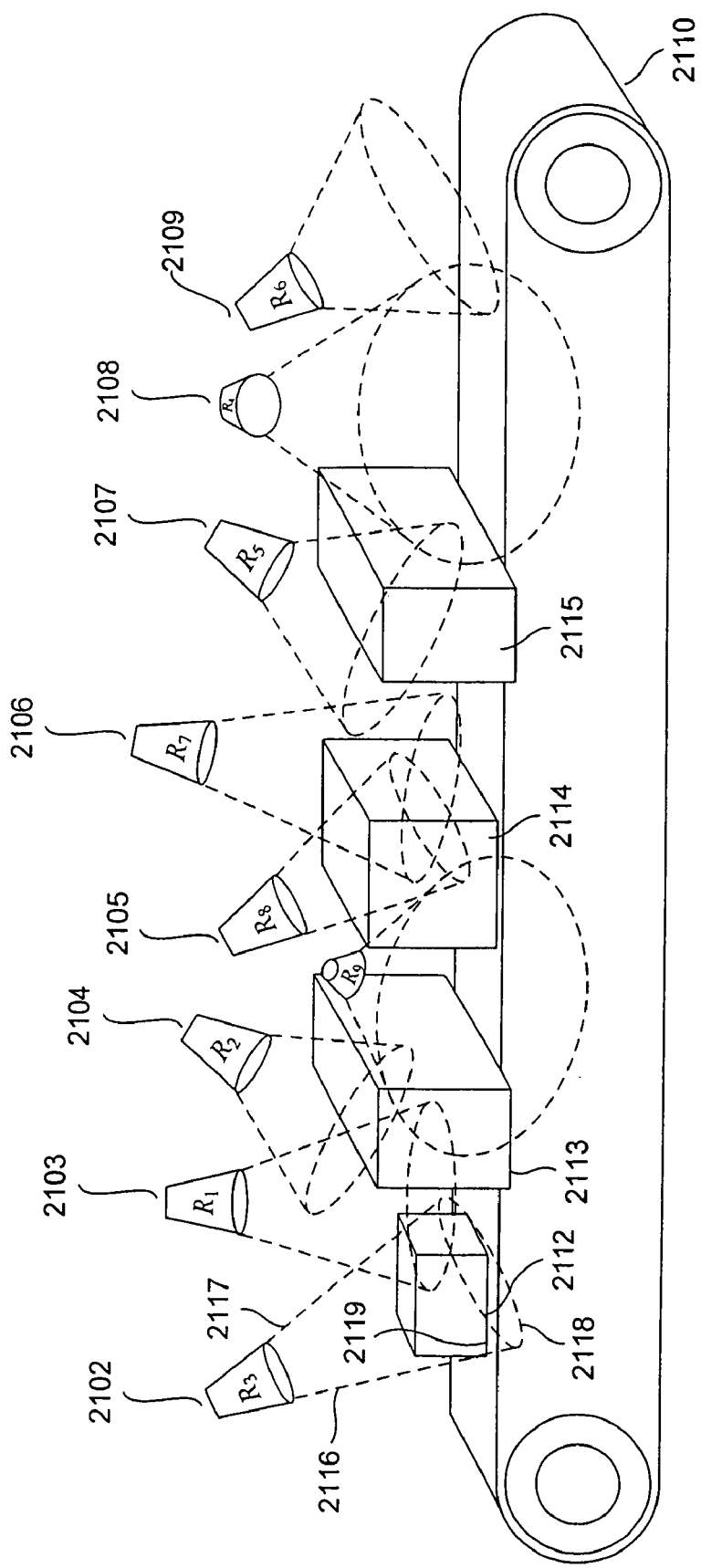
FIG. 21 illustrates a multiple RFID-tag-reader network that is used for describing method and system embodiments of the present invention.

FIG. 21 illustrates a multiple RFID-tag-reader network that is used for describing method and system embodiments of the present invention. In FIG. 21, and in subsequent figures that show the multiple-RFID-tag-reader environment shown in FIG. 21, nine different RFID-tag readers 2102-2109 are arranged above and around a conveyor belt 2110 which transports parcels 2112-2115 past the RFID-tag readers so that RFID tags within the parcels can be interrogated. The fields of the RFID-tag readers are indicated in FIG. 21 by cone-shaped volumes delineated with dashed lines. For example, the field of RFID-tag reader $R_3$ 2102 is indicated by dashed lines 2116-2119. The RFID-tag readers have different orientations and field dimensions to maximize the probability that at least one RFID-tag reader from among the nine RFID-tag readers can successfully interrogate each RFID tag within a parcel that passes the RFID-tag readers.

Figure 22:
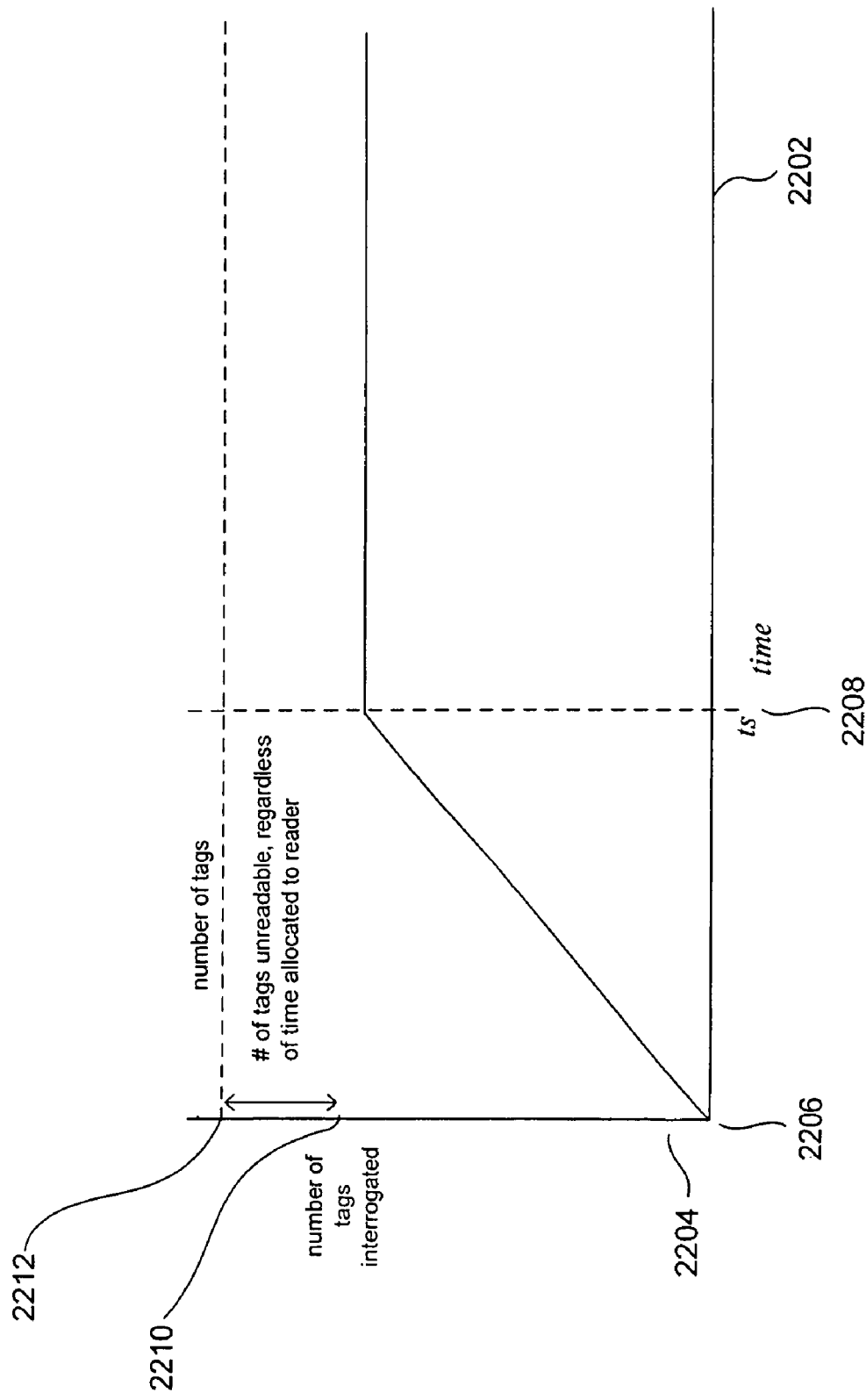
FIG. 22 illustrates a model RFID-tag-reader saturation curve.

Each RFID-tag reader can be characterized with a saturation time. When a set of RFID tags are present within the field of an RFID-tag reader, assuming that the RFID-tag reader and RFID tags employ time-based multiplexing by means of a back-off collision-avoidance method, the RFID-tag reader can steadily interrogate more and more RFID tags within its field over time up to a saturation time $t_s$, past which the RFID-tag reader cannot interrogate any additional tags. FIG. 22 illustrates a model RFID-tag-reader saturation curve. The horizontal axis 2202 represents time and the vertical axis 2204 represents the number of tags successfully interrogated by an RFID-tag reader. At time t=0 2206, no tags have been interrogated. As the time increases up to the saturation time $t_s$ 2208, the number of tags successfully interrogated linearly rises up to a saturation point 2210 representing the total number of tags that can be successfully interrogated by the RFID-tag reader. In general, the saturation point 2210 is below the total number of tags 2212 within the field of the RFID-tag reader. Often, particularly with inexpensive, passive RFID tags, a certain number of RFID tags within the field may be orientated so that the RFID-tag antennas do not sufficiently strongly couple with the RF carrier signal emitted by the RFID-tag reader to extract sufficient power to energize the RFID-tags' IC. In other cases, the tags may be defective or incompatible with the RFID-tag reader. Although a linear saturation curve is assumed, in the following discussion, a variety of different types of saturation curves may be observed for different RFID-tag readers and RFID tags. Saturation curves may be S-shaped, or described by any of a variety of different polynomial, transcendental, and other types of functions.

Figure 23:
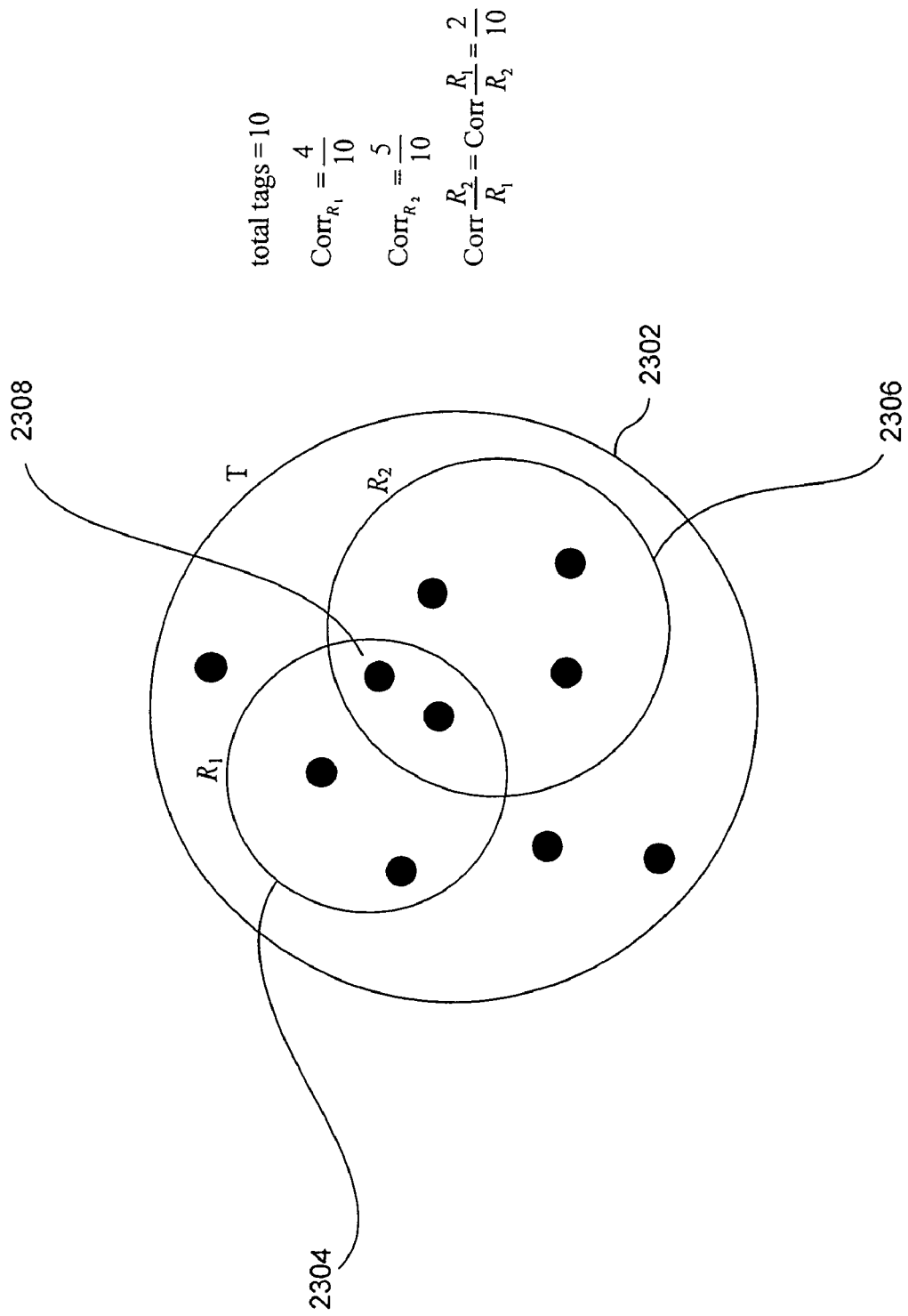
FIG. 23 illustrates two different types of correlations associated with RFID-tag readers in multi-RFID-tag-reader networks.

In a multi-RFID-tag-reader network, each RFID-tag reader can be characterized by a correlation between the RFID-tag reader and the RFID tags that move through the RFID-tag-reader's field, as well as by pairwise correlations between the RFID-tag reader and all other RFID-tag readers in the multi-RFID-tag-reader network. FIG. 23 illustrates two different types of correlations associated with RFID-tag readers in multi-RFID-tag-reader networks. In FIG. 23, the total number of RFID tags that can be potentially interrogated by two different RFID-tag readers $R_1$ and $R_2$ are contained within an outer circle 2302 labeled "T," each RFID tag represented by a small, filled circle. Of the total number of RFID tags that may be interrogated by each of the RFID-tag readers, the number of RFID tags that are successfully interrogated by RFID-tag reader $R_1$ are contained within the inner circle 2304 labeled $R_1$ in FIG. 23. Similarly the tags successfully interrogated by the RFID-tag reader $R_2$ are contained within the inner circle 2306 in FIG. 23. The number of tags successfully read by both of the RFID-tag readers $R_1$ and $R_2$ is represented in FIG. 23 by the intersection between the areas circumscribed by circles 2304 and 2306 2308. The correlation of the first RFID-tag reader $R_1$ with the tags within its field, or correlation with the event, designated $corr_{R_1}$, is the number of RFID tags successfully read by RFID-tag reader $R_1$ divided by the number of RFID tags potentially successfully interrogated by RFID-tag reader $R_1$ or, in the example shown in FIG. 23, 4/10 or 0.4. Similarly, the correlation of RFID-tag reader $R_2$, $corr_{R_2}$, with the event is, in the example shown in FIG. 23, 5/10 or 0.5. The pairwise correlation between the two RFID-tag readers $R_1$ and $R_2$, designated $corr_{R_1}^{R_2}$, is equal to the number of RFID tags successfully interrogated by both RFID-tag readers $R_1$ and $R_2$ divided by the total number of RFID tags potentially successfully interrogated by either or both of the RFID-tag readers, in the example shown in FIG. 23, 2/10 or 0.2. Highly correlated RFID-tag readers may, in an environment such as that depicted in FIG. 21, represent a redundancy. RFID-tag readers with low correlations to the event, the event in the environment depicted in FIG. 21 being the total number of RFID tags within parcels that pass through the fields of the multiple RFID-tag readers during some period of time, suggest that the RFID-tag readers are ineffective, contribute little to the overall interrogation effectiveness of the multi-RFID-tag-reader network, and are potentially dispensable.

Figure 24:
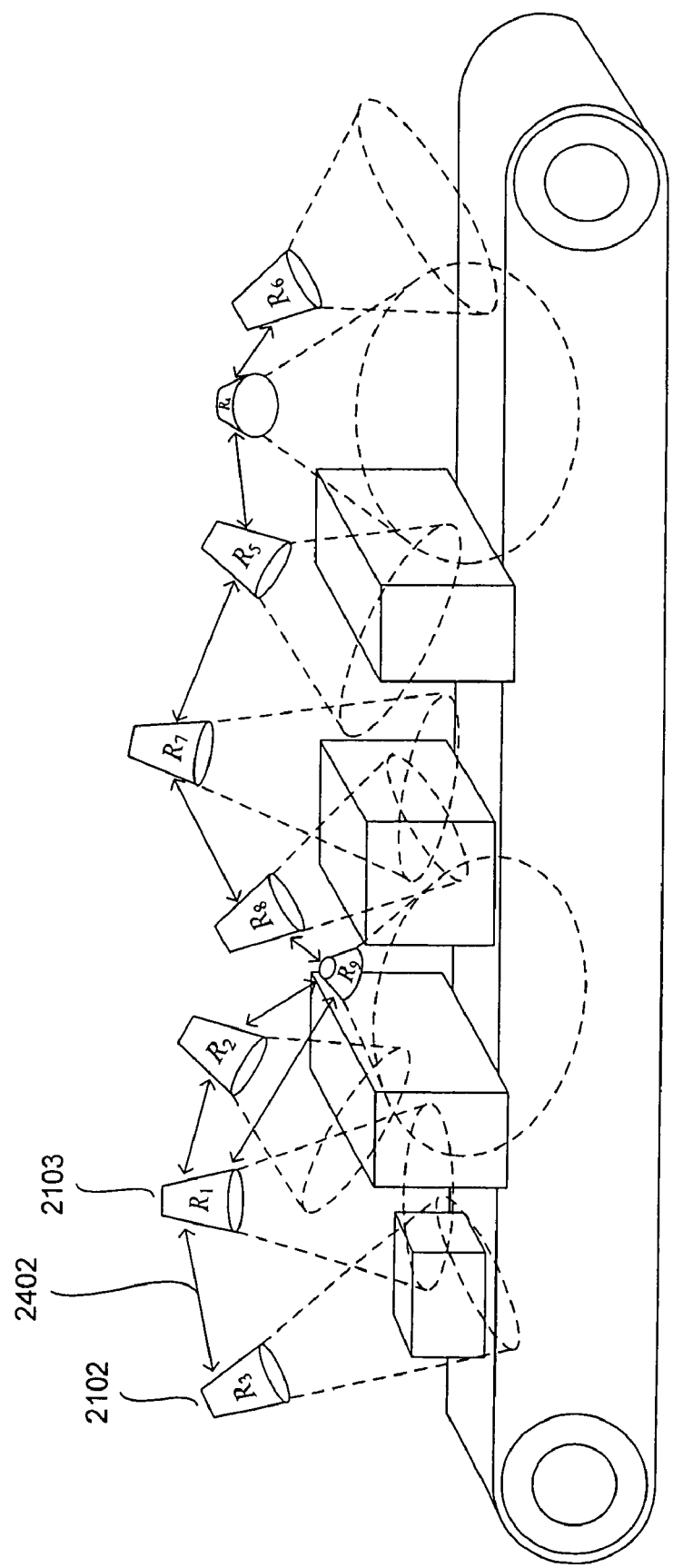
FIG. 24 illustrates pairwise interferences between RFID-tag readers in the multi-RFID-tag-reader network depicted in FIG. 21.

FIG. 24 illustrates pairwise interferences between RFID-tag readers in the multi-RFID-tag-reader network depicted in FIG. 21. In FIG. 24, RFID-tag readers with overlapping fields are indicated by double-headed arrows, such as double-headed arrow 2402 indicating that the fields of RFID-tag reader $R_3$ 2102 overlaps with the field of RFID-tag reader $R_1$ 2103. When RFID-tag-reader fields overlap, collisions may occur when RFID tags within the overlapped portion of the two fields attempt to respond to RF carrier signals emanating from the two different RFID-tag readers.

Figure 25:
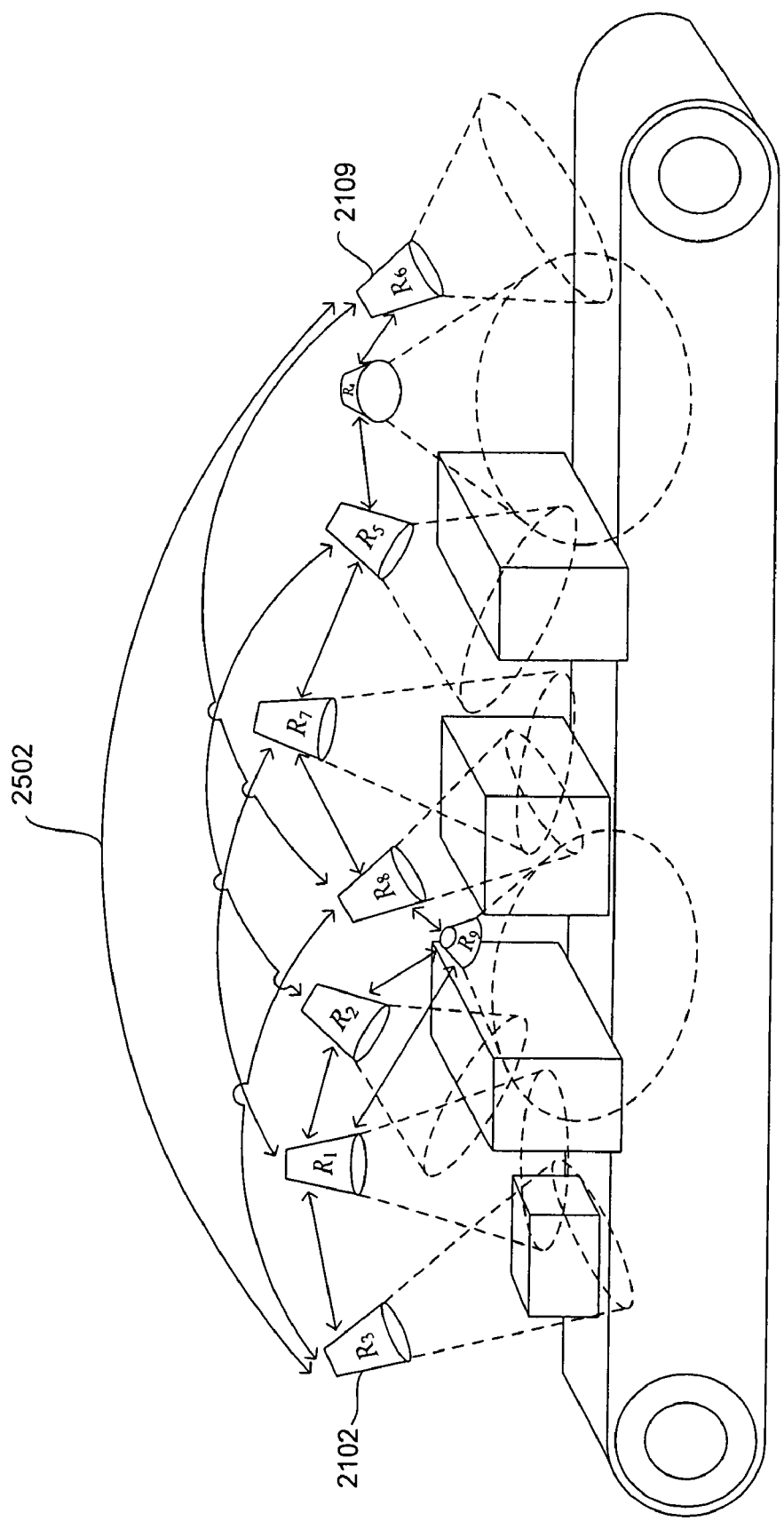
FIG. 25 illustrates high correlations between pairs of RFID-tag readers in the multi-RFID-tag-reader network shown in FIG. 21.

FIG. 25 illustrates high correlations between pairs of RFID-tag readers in the multi-RFID-tag-reader network shown in FIG. 21. In FIG. 25, double-headed arrows indicate high correlations between pairs of RFID-tag readers, such as the double-headed arrow 2502 that indicates a high correlation between RFID-tag reader $R_3$ 2102 and RFID-tag reader $R_6$ 2109. In general, high correlations exist between RFID-tag readers with similar orientations in the example of FIGS. 21 and 24-25.

Certain method and system embodiments of the present invention employ graph-theoretical modeling of a multi-RFID-tag-reader network, or network, such as that shown in FIG. 21. Two different collision-graph representations of the multi-RFID-tag-reader network shown in FIGS. 21 and 24-25 are provided in FIG. 26. In a first collision-graph representation 2602, the RFID-tag readers are represented by vertices, or nodes, such as vertex 2604 representing RFID-tag-reader $R_4$ (2108 in FIG. 21). Interferences between RFID-tag readers within the RFID-tag-reader network are represented by edges between vertices or nodes. For example, edge 2606 between vertices 2608 and 2610 representing RFID-tag readers $R_3$ 2102 and $R_1$ 2103 represents the interference illustrated in FIG. 24 by double-headed arrow 2402. In the first graph representation 2602 of the multi-RFID-tag-reader network, dashed circles, such as dashed circle 2612, are drawn around sets of RFID-tag readers that represent independent subsets of vertices. Thus, there are no edges between the vertices 2614-2617 within dashed circle 2612 indicating that there are no interferences between the RFID-tag readers represented by vertices 2614-2617. The minimal k for which collision graph 2602 is k-partite is three. An alternative collision-graph representation 2618 of the multi-RFID-tag-reader network shown in FIG. 21 is also provided in FIG. 26.

In general, in the case of frequency-based multiplexing or time-based multiplexing under conditions in which each RFID-tag reader has sufficient time to reach its saturation point for each collection of RFID tags passing within portions of its field that do not overlap with the fields of other RFID-tag readers, one can obtain optimal RFID-tag interrogation efficiency, or successful interrogation of as many RFID tags that pass through the fields of the RFID-tag readers as possible, by the multi-RFID-tag-reader network by turning on only one RFID-tag reader at a time, allowing it to reach its saturation point, turning it off, and then turning on another of the multiple RFID-tag readers so that each RFID-tag reader reaches its saturation point during a given cycle or power-on/power-off operations. Similarly, when a multi-RFID-tag-reader network can be partitioned into a number of independent sets of RFID-tag readers, so that groups of non-interfering RFID-tag readers can be powered-on, one group at a time, in a way that allows all RFID-tag readers to reach saturation, then a perfect scheduling of RFID-tag reader operation can be easily achieved, either by frequency-based or time-based multiplexing. However, when time-based multiplexing is employed by use of back-off collision avoidance methods, as discussed above, and when the RFID tags pass through an RFID-tag-reader's field too quickly to allow the RFID-tag reader to reach the saturation point, devising optimal interrogation strategies can be a complex undertaking. In such cases, it is desirable to power each of the RFID-tag readers as long as possible, in order to allow each of the RFID-tag readers to approach its saturation point as closely as possible, but alternately powering-on and powering-off RFID-tag readers with overlapping fields to avoid collisions. Such a strategy may be further adjusted by recognizing that only one of a highly correlated pair of multi-tag-readers needs to be powered-on for significant periods of time, since the highly correlated readers represent redundant interrogation, and by also recognizing that an RFID-tag reader with a low correlation to the event may be given substantially less time, or may be powered off entirely, since an RFID-tag reader with low correlation to the event may not contribute greatly to the overall degree of successful interrogation by the multi-RFID-tag-reader network. One approach to achieving efficient or optimal operation of a multi-RFID-tag-reader network is to alter the network so that the network can be modeled as a low-partite graph, if the original network cannot be so modeled. In certain cases, when the network can be modeled as a bipartite graph, or altered so that the network can be modeled as a bipartite graph, the greatest amount of operation time can be allocated to each RFID-tag reader within the network during each complete cycle of power-on/power-off operations, particularly in cases in which the bipartite-graph model can be achieved by rearrangement of RFID-tag readers to remove interferences or by eliminating low-event-correlation RFID-tag readers. In general, the interrogation efficiency can be considered to be the number of RFID tags successfully interrogated by at least one RFID-tag reader in a multi-RFID-tag-reader network divided by the total number of RFID tags that pass through the fields of at least on RFID-tag reader in the multi-RFID-tag-reader network.

Figure 27:
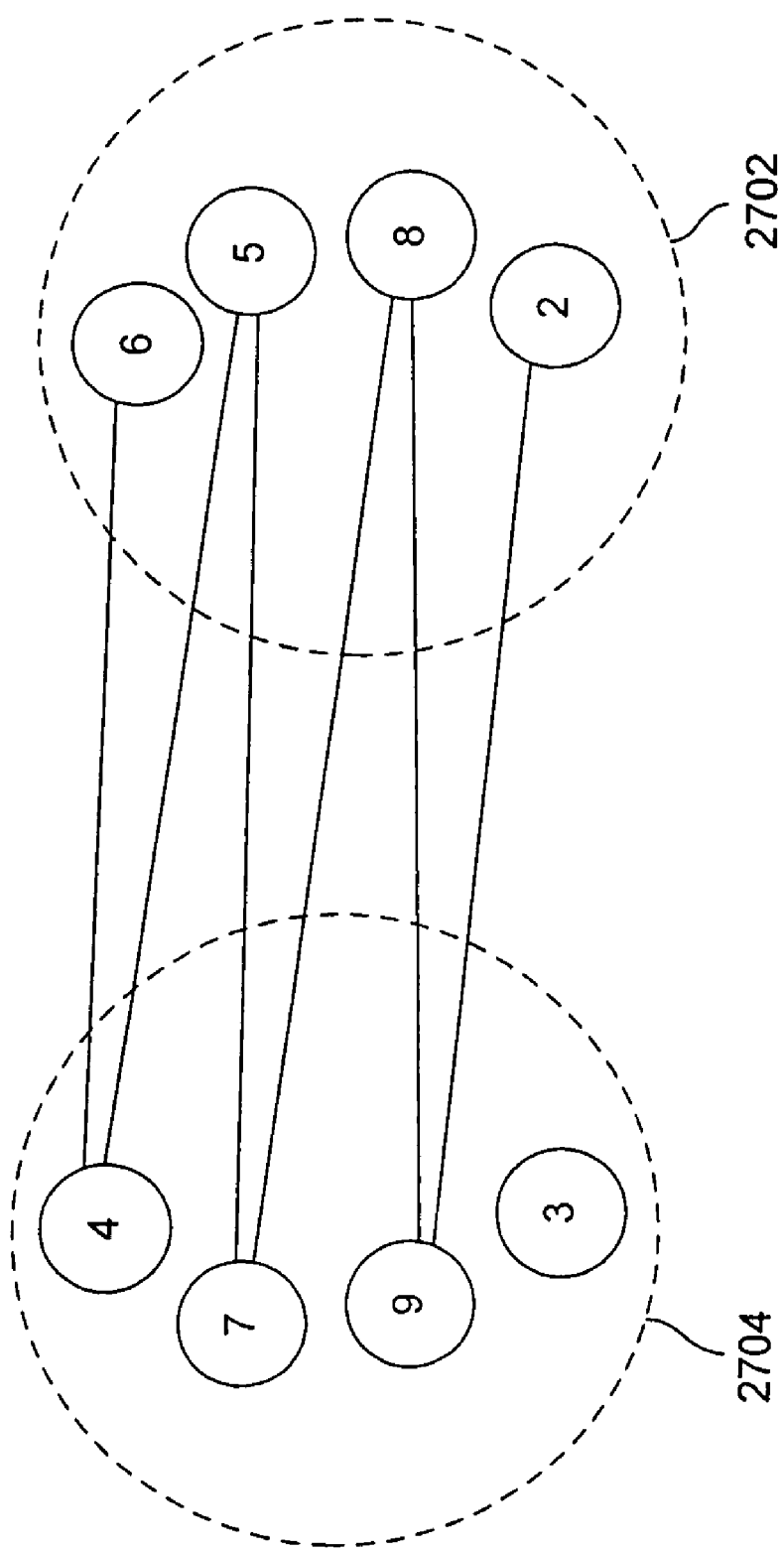
FIG. 27 illustrates a first approach to achieving efficiency in a multi-RFID-tag-reader network that represents one embodiment of the present invention.

FIG. 27 illustrates a first approach to achieving efficiency in a multi-RFID-tag-reader network that represents one embodiment of the present invention. FIG. 27 is a collision graph of the multi-RFID-tag-reader network illustrated in FIG. 21 that has been altered by removing, or permanently powering down, one of the RFID-tag readers. This can be seen by comparing the collision graph shown in FIG. 27 with collision graph 2602 in FIG. 26. The altered collision graph shown in FIG. 27 is a bipartite collision graph obtained by removing RFID-tag reader $R_1$ (2103 in FIG. 21). By removing RFID-tag reader $R_1$, the remaining RFID-tag readers can be partitioned into two independent subsets or, in other words, into two non-interfering groups. Removal of RFID-tag reader $R_1$ is an example of a node-removal perturbation of a multi-RFID-tag-reader network modeled as a collision graph. RFID-tag reader $R_9$ may also have been removed to produce a bipartite, altered collision graph, but it may be more desirable to remove RFID-tag reader $R_1$ since RFID-tag reader $R_1$ is highly correlated with RFID-tag reader $R_7$, while RFID-tag reader $R_9$ is not strongly correlated with any other RFID-tag reader in the multi-RFID-tag-reader network.

It may not be necessary to alter a multi-RFID-tag network in order to achieve an efficient interrogation schedule. The original multi-RFID-tag network may already be bipartite. Alternatively, the original multi-RFID-tag network may have a minimum k for which the collision graph representing the multi-RFID-tag network is k-partite that is of sufficiently small magnitude to allow for an efficient interrogation schedule to be devised. Thus, for example, the originally 3-partite multi-RFID-tag network illustrated in FIG. 21 may be sufficiently efficiently schedulable, without removing any nodes.

Figure 28:
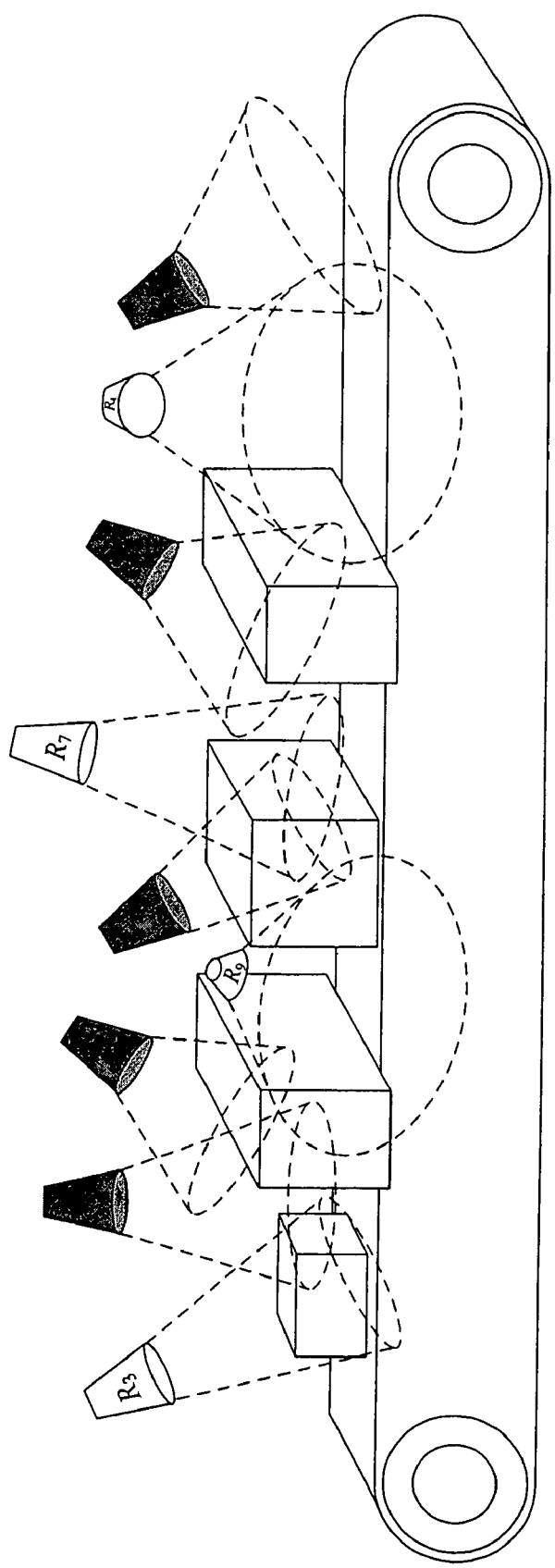
Figure 29:
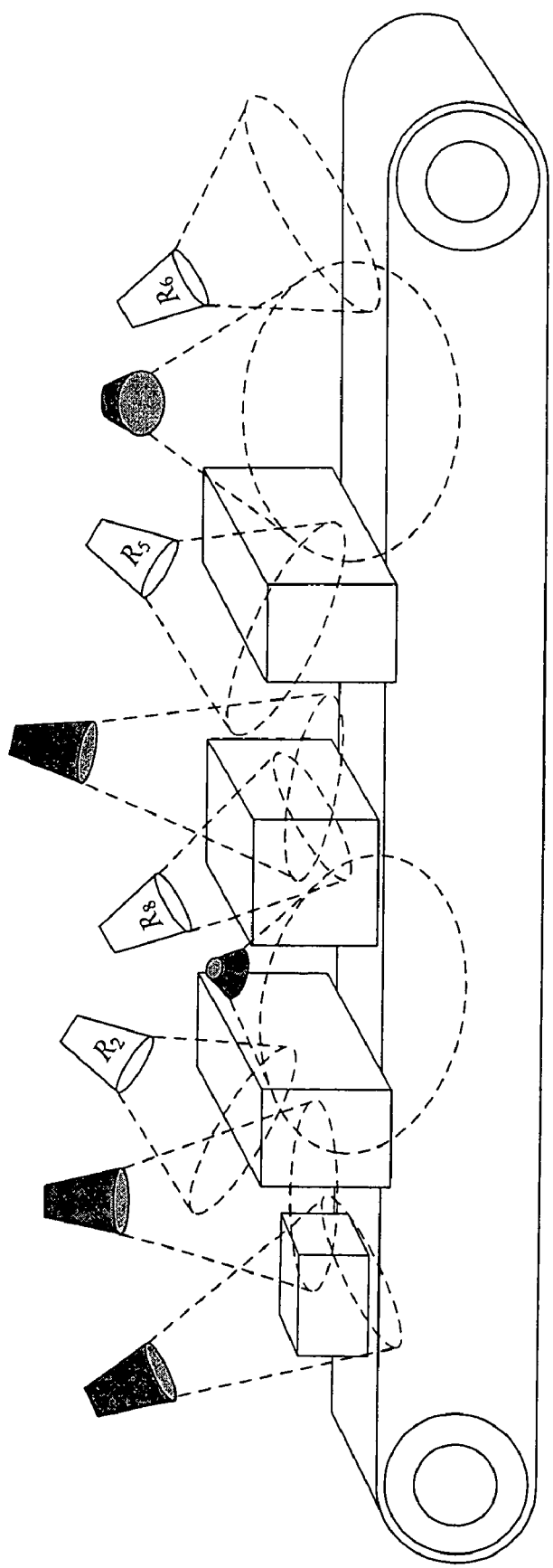

Having removed, or permanently powered down, RFID-tag reader $R_1$, a simple interrogation strategy is to alternate powering-up and powering-down of each independent subset of RFID-tag readers for equal-length periods. FIG. 28 illustrates a first period in a cycle of power-on/power-off operations of the interrogation strategy in which RFID-tag readers of independent subgroup 2702 in FIG. 27 are powered-on. FIG. 29 illustrates a second period in a cycle of power-on/power-off operations of an interrogation strategy in which RFID-tag readers of a second independent subgroup 2704 in FIG. 27 are powered-on. In FIGS. 28 and 29, powered-off RFID-tag readers are shown darkly shaded, while powered-on RFID-tag readers are shown unshaded. In both cycles, RFID-tag-reader $R_1$ is powered off. By alternating the periods shown in FIGS. 28 and 29, each RFID-tag reader is given as much time as possible without chance of collisions due to interference between pairs of RFID-tag readers. Additional factors may be considered to choose the groupings of RFID-tag readers, when multiple groupings are possible, and to choose the respective lengths of periods. For example, in the case illustrated in FIGS. 27-29, it may turn out that RFID-tag readers $R_4$, $R_7$, $R_9$, and $R_3$, all belonging to the second independent subgroup 2704 in FIG. 27, may have much higher event correlations than the RFID-tag readers in the first independent subgroup 2702 in FIG. 27. In this case, it may be prudent to power on the RFID-tag readers of the second group 2704 in FIG. 27 for a longer period of time than the RFID-tag readers of the first group 2702. In other words, in this case, the length of the second period shown in FIG. 29 may be longer than the length of the first period, shown in FIG. 28, to increase the total number of RFID tags that can be successfully interrogated by the multi-RFID-tag-reader network.

Weights may be assigned to nodes of a collision graph to assist in choosing nodes for removal and/or choosing a partition of the collision graph into k partitions that can be then scheduled as a cycle of power-on/power-off periods in which each of the RFID-tag readers represented by the nodes in a next partition selected from among the k partitions is powered on, while the remaining RFID-tag readers represented by the nodes in a next partition selected from among the k partitions is powered on One technique for partitioning a collision graph into k independent subsets of nodes is to color the graph with k different colors. When a perfect coloring of a graph is obtained, the graph can be partitioned into k independent subsets of nodes by placing all nodes of each color into a separate partition. Otherwise, nodes can be removed, and the graph can be recolored, until a perfect coloring is achieved.

Figure 30:
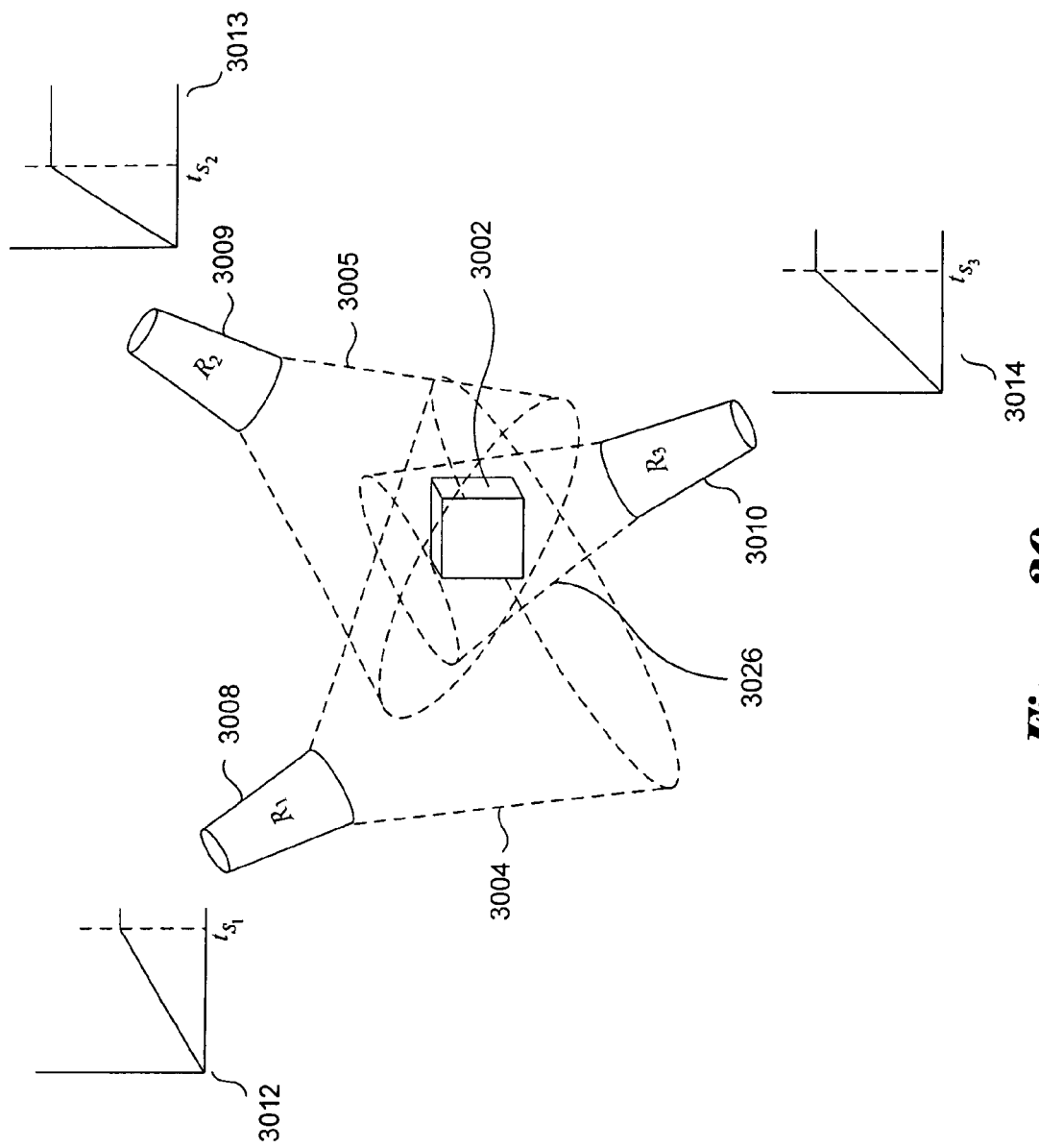
FIGS. 30-31C illustrates considerations of scheduling power-on intervals of multiple RFID-tag readers with overlapping fields for reading tags from a single box within all of the overlapping fields.
Figure 31A:
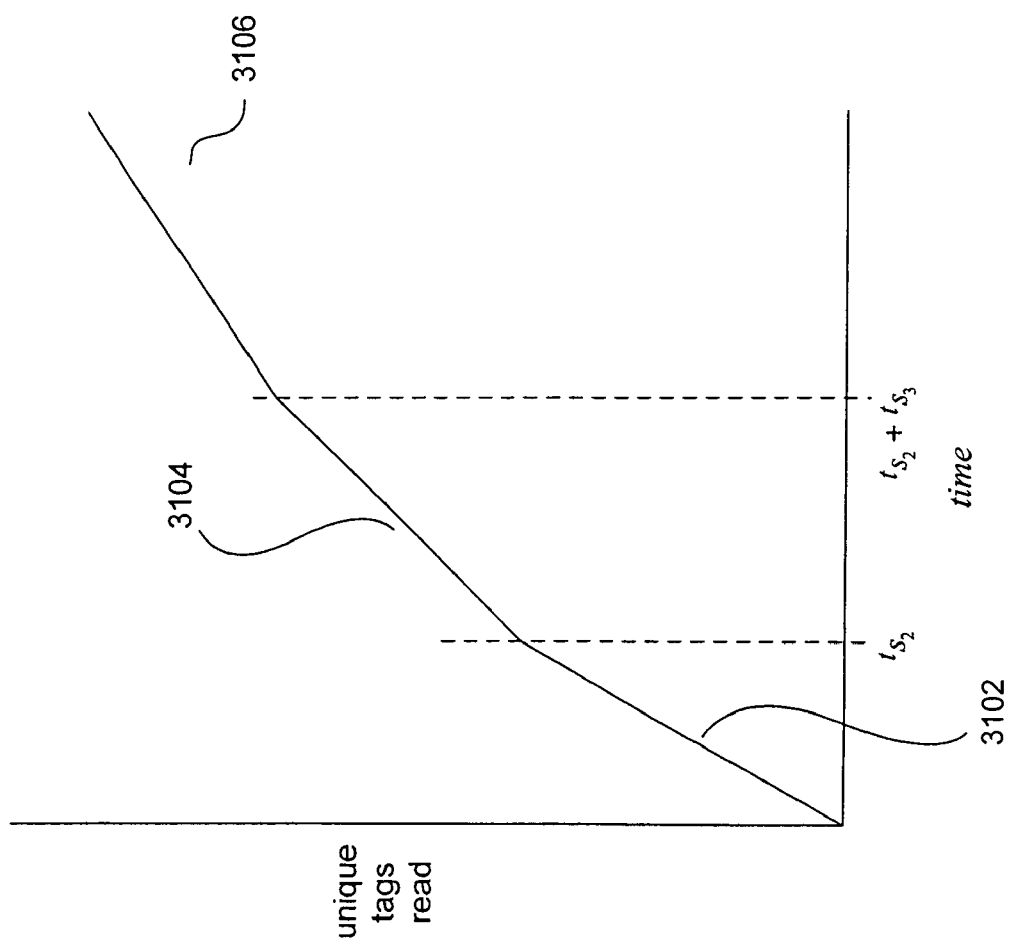
Figure 31B:
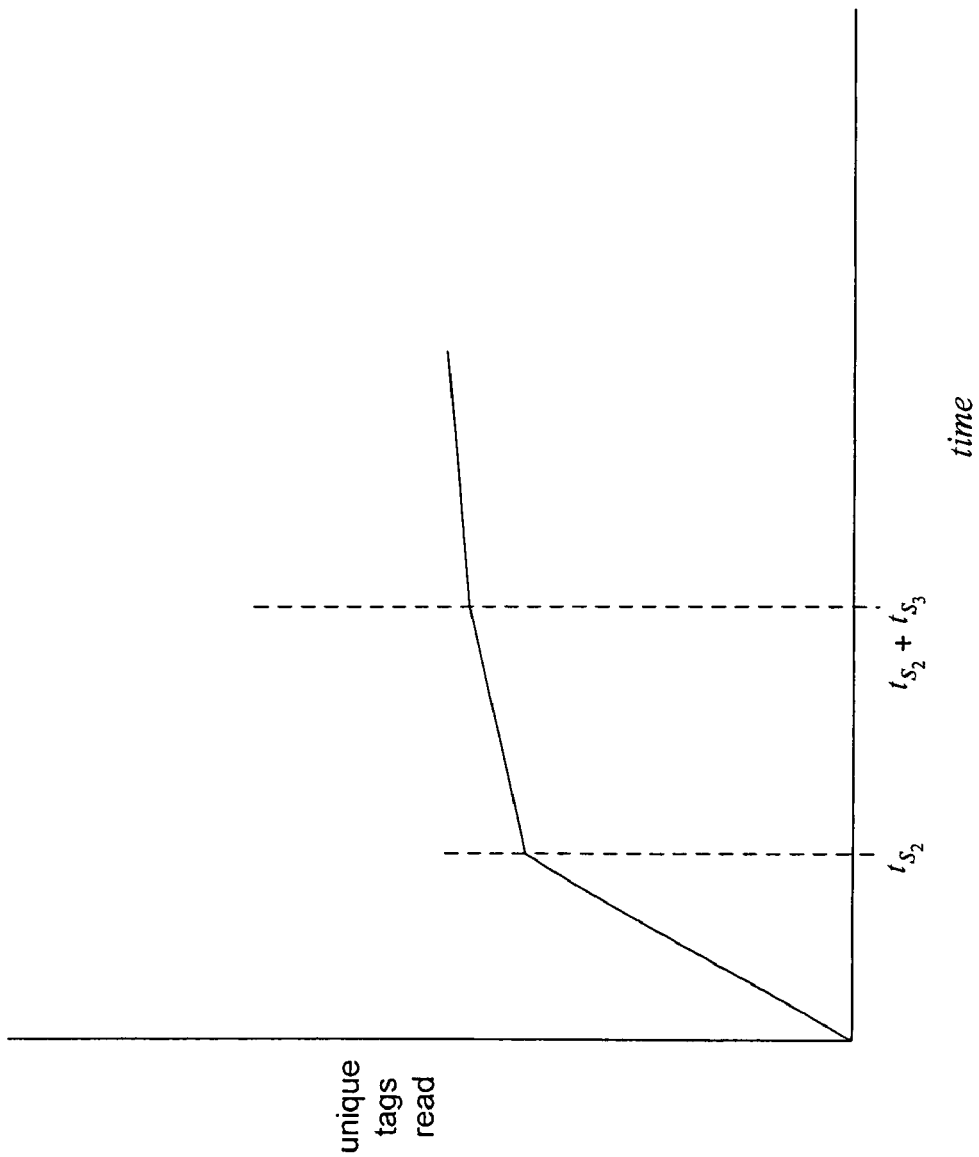
Figure 31C:
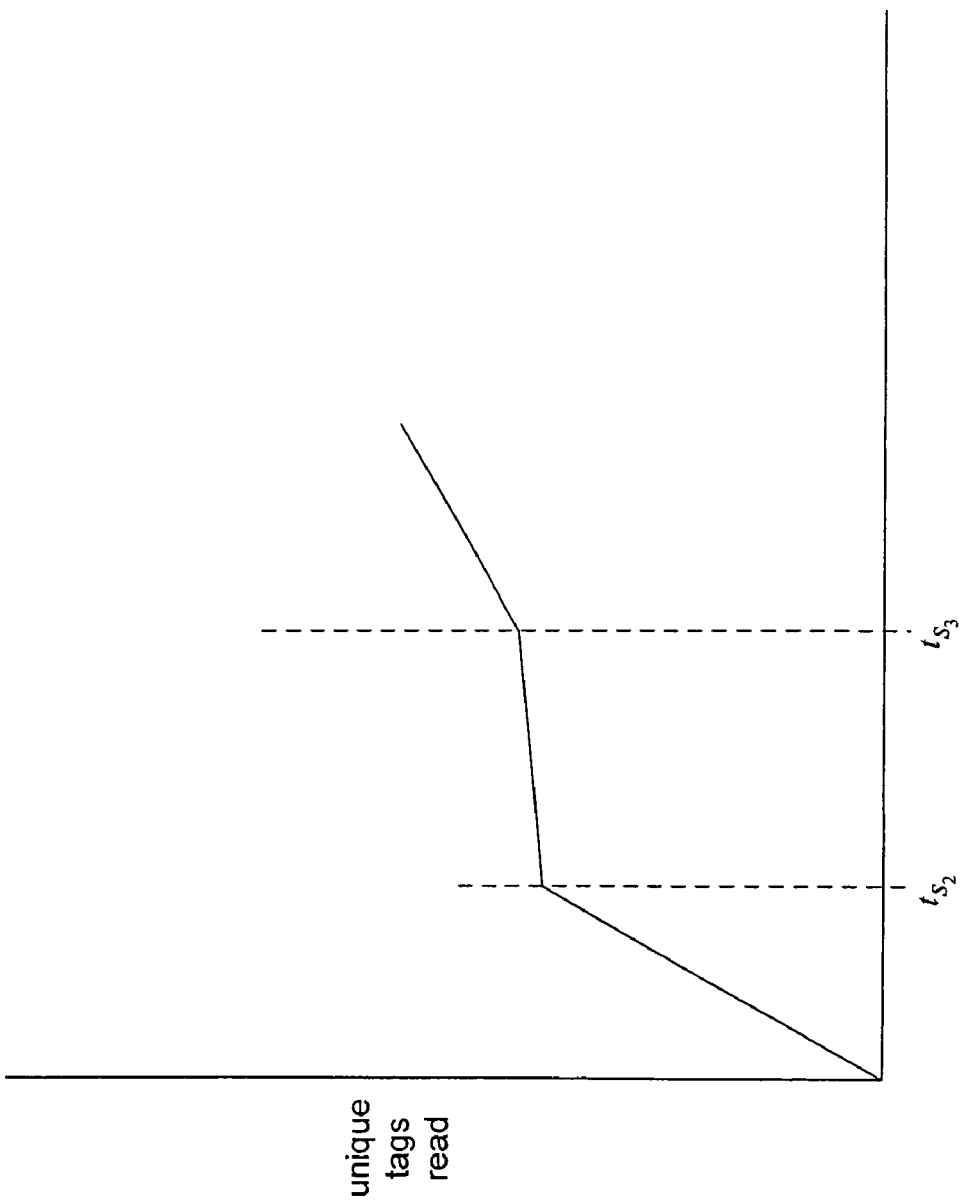

Once a reasonable partitioning of a multi-RFID-tag-reader network into k independent subgroups of RFID-tag readers has been obtained, the next task is to schedule power-on and power-off intervals for the subgroups of RFID-tag readers. FIGS. 30-31C illustrates considerations of scheduling power-on intervals of multiple RFID-tag readers with overlapping fields for reading tags from a single box within all of the overlapping fields. In FIG. 30, a box 3002 containing multiple RFID tags is shown within the overlapping fields 3004-3006 of three RFID-tag readers $R_1$ 3008, $R_2$ 3009, and $R_3$ 3010, respectively. The saturation curves 3012-3014 for each of the three RFID tag readers are shown associated with their respective RFID-tag readers in FIG. 30. As can be seen by comparing the slopes of the three saturation curves, RFID-tag reader $R_2$ 3009 has the highest rate of successful interrogation, followed next by RFID-tag reader $R_3$. RFID-tag reader $R_1$ has the lowest rate of successful interrogation. These are rates of successful interrogation by each of the RFID-tag readers alone.

Given the multi-RFID-tag-reader environment illustrated in FIG. 30, an initial optimal interrogation schedule for the three RFID-tag readers can be obtained by scheduling power-on intervals of the RFID-tag readers in decreasing order of successful interrogation rate. FIG. 31A illustrates this initial scheduling. As shown in FIG. 31A, the RFID-tag reader with the greatest successful interrogation rate, $R_2$, is first powered on for time equal to RFID-tag-reader $R2$'s saturation time $t_{s_2}$, while RFID-tag readers $R_1$ and $R_3$ are powered off. Then, RFID-tag reader $R_3$, with the next greatest successful interrogation rate, is powered on for a length of time $t_{s_3}$ 3104, while RFID-tag readers $R_1$ and $R_2$ are powered off. Finally, RFID-tag reader $R_1$ is powered on 3106 while RFID-tag readers $R_2$ and $R_3$ are powered off. If the total time available for reading is sufficient to allow all three RFID-tag readers to read up to their saturation level, or the total time available is greater than or equal to $t_{s_1}+t_{s_2}+t_{s_3}$, then the greatest number possible of RFID tags are successfully interrogated by the system of three RFID-tag readers, regardless of the ordering of power-on intervals within the power-on/power-off cycle. If the available time is less than $t_{s_1}+t_{s_2}+t_{s_3}$, then the scheduling illustrated in FIG. 31A should nonetheless be used, since this scheduling ensures that the maximum possible number of RFID tags are successfully read within the available time. If the available time is less than $t_{s_2}$, for example, it is nonetheless most efficient to power-on the fastest RFID-tag reader $R_2$ for the entire interval.

The scheduling illustrated in FIG. 31A assumes no correlation between pairs of RFID-tag readers. In other words, the rate of unique RFID-tag interrogation during each power-on interval is equal to the rate of successful RFID-tag interrogation for the RFID-tag reader powered on. When the readers are correlated, but when, despite that correlation, the rates of unique RFID-tags successfully read for the three RFID-tag readers have the same order as for the uncorrelated successful interrogation rates, $R_2>R_3>R_1$, then the scheduling illustrated in FIG. 31A remains the optimal scheduling, although the overall rate of successful interrogation of unique RFID tags is substantially less for power-on intervals following the first power-on interval. FIG. 31B illustrates the scheduling assuming pairwise correlation between RFID readers such that the rates of unique RFID-tags successfully read for the three RFID-tag readers have the order $R_2>R_3>R_1$. Note, in FIG. 31B, that total unique RFID tags read increases far less rapidly following completion of RFID-tag reader $R_2$'s power-on interval.

However, the pairwise correlation between the three RFID-tag readers shown in FIG. 30 may be such that, despite having a lower standalone rate of successful interrogation, RFID-tag reader $R_1$ successfully interrogates RFID tags not read by RFID-tag reader $R_1$ at a much higher rate than RDIF-tag reader $R_3$, due to a high pairwise correlation between RFID-tag reader $R_2$ and $R_3$ and a low correlation between RFID-tag reader $R_2$ and $R_1$. FIG. 31C illustrates the rate of successful unique RDIF-tag interrogation using the order of power-on intervals used in the schedulings illustrated in FIGS. 31A-B, but assuming that the rates of unique RFID-tags successfully read for the three RFID-tag readers have the order $R_2>R_1>R_3$. The schedule illustrated in FIG. 31C is suboptimal when the total time allocated for reading is less than $t_{s_1}+t_{s_2}+t_{s_3}$ but greater than $t_{s_2}$. In this case, RFID-tag reader $R_3$ is least efficient, but is powered-on in favor of RFID-tag reader $R_1$.

As can be seen from the example presented in FIGS. 30-31C, an optimal schedule schedules the most efficient RFID-tag reader first, for that RFID-tag reader's saturation time, and then schedules successive RFID-tag readers for their saturation times in order of their efficiency in reading RFID tags not yet read in preceding power-on intervals. The efficiency in reading RFID tags not yet read in preceding power-on intervals by an RFID-tag reader may depend both on the RFID-tag reader's standalone rate of successful RFID tag interrogation as well as on correlations between the RFID-tag reader and other RFID tag readers.

Figure 32:
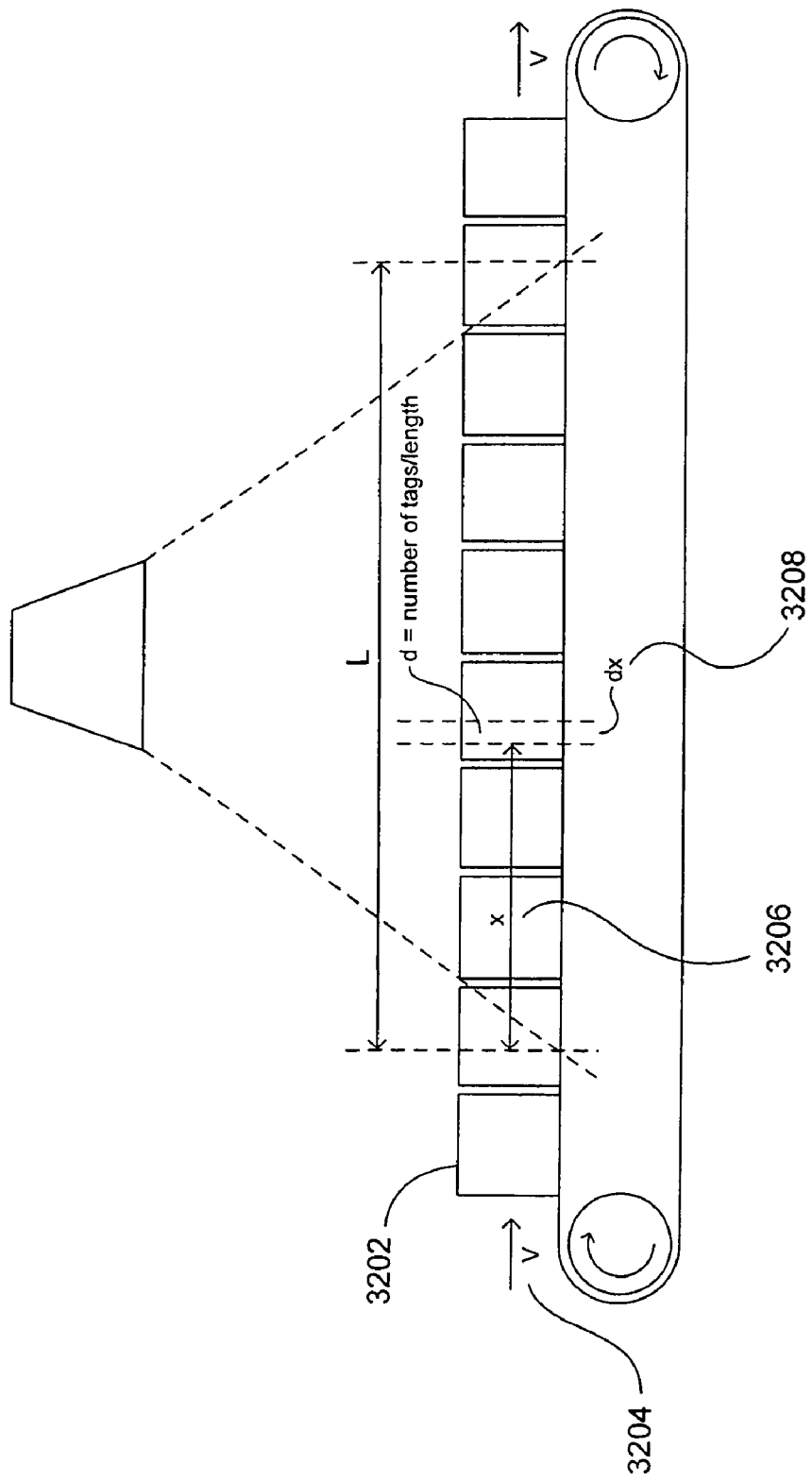
FIG. 32 illustrates calculation of the number of RFID tags read by an RFID tag reader that reads tags in parcels moving along a conveyor belt into and out of the RFID-tag reader's field.

FIG. 32 illustrates calculation of the number of RFID tags read by an RFID tag reader that reads tags in parcels moving along a conveyor belt into and out of the RFID-tag reader's field. In FIG. 32, RFID tags in parcels, such as parcel 3202, move at a velocity v 3204 through a field of width L. The probability that an RFIF tag is successfully read by the RFID-tag reader depends on the distance x 3206 that the tag has moved through the field, or equivalently the time x/v that the RFID tag has spent in the field. The RFID tags are assumed to be present at a density of d tags per linear distance, and the calculation of the tags read in a length of boxes equal to the width of the RFID-tag reader's field considers a differential length dx 3208 within the field.

The probability that an RFID tag within a differential length dx has been read, $P_{dx}$, is:

$$P_{dx} = \left[\frac{\frac{x}{v}}{t_s}\right] Corr_R$$

where $t_s$ is the saturation time for the reader R, and $Corr_R$ is the correlation of the reader with the event.

The average number of RFID tags read in the differential length dx is therefore:

$$TagsRead_{dx} = P_{dx}(dx*d) = \left[\frac{\frac{x}{v}}{t_s}\right] Corr_R(dx*d)$$

The total number of tags read from the field in the time that it takes for a box moving at velocity v to traverse the field is therefore:

$$TagsRead = \int_0^L \frac{(Corr_R)d}{t_s v} x dx = \frac{(Corr_R)}{t_s} \frac{d}{2v} L^2$$

Thus, the number of tags read by an RFID-tag reader during an arbitrary length of time, with RFID tags, at an arbitrary density, moving through a field of arbitrary size at constant velocity, is generally proportional to:

$$\frac{Corr_R}{t_s}$$

Figure 33:
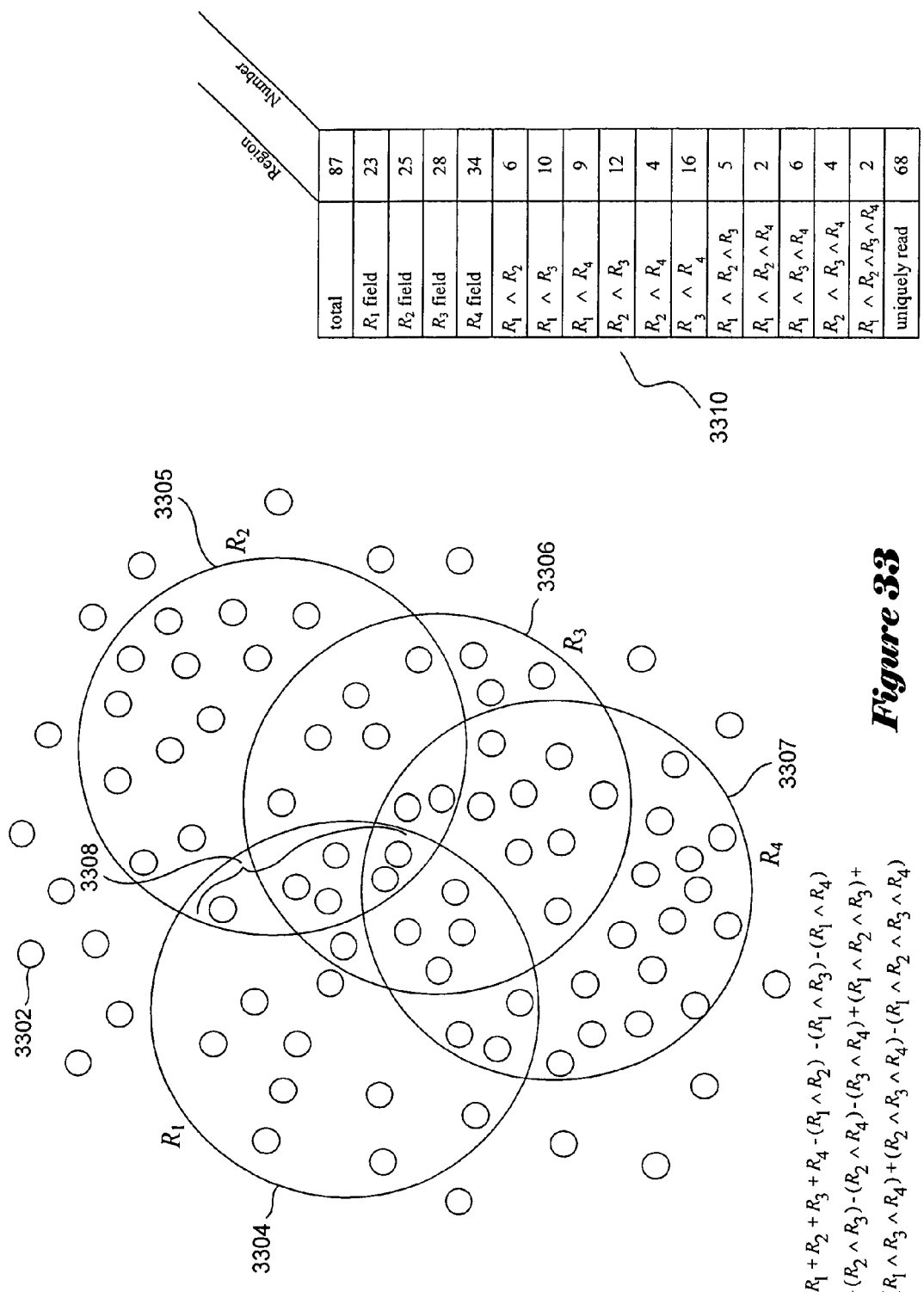
FIG. 33 illustrates computing unique tags read from overlapping fields of multiple RFID-tag readers.

FIG. 33 illustrates computing unique tags read from overlapping fields of multiple RFID-tag readers. FIG. 33 uses illustration convention used in FIG. 23, discussed above. In FIG. 33, 87 different RFID tags corresponding to an event are represented, as in FIG. 23, by small circles, such as circle 3302. The RFID tags within each of the circles 3304-3307 represent the RFID tags successfully interrogated by the RFID-tag readers $R_1, R_2, R_3, R_4$ represented by circles 3304-3307, respectively. For example, RFID-tag reader $R_1$ successfully interrogates 23 RFID tags from among the total of 87 RFID tags that define the event. Overlap regions between the circles define set intersections between two or more of the sets of successfully interrogated RFID tags by individual RFID-tag readers. For example, the intersection 3308 between circles 3304 and 3305, corresponding to the RFID tags successfully read by both RFID-tag readers $R_1$ and $R_2$, denoted $R_1 \wedge R_2$, includes 6 RFID tags. Three-way intersections and a single 4-way intersection are also observed in FIG. 33. The table 3310 includes entries indicating the number of RFIID tags read by each RFID-tag reader, the number of tags in the various 2-way, 3-way, and 4-way intersections, the total number of RFID tags, and the total number of unique tags read by all four RFID-tag readers. As discussed, the cardinality of the sets of tags successfully interrogated by RFID-tag readers $R_1$, $R_2, R_3$, and $R_4$, divided by the total number of RFID tags in the event, are defined as the correlations of the RFID-tag readers $Corr_{R_1}, Corr_{R_2}, Corr_{R_3}, Corr_{R_4}$, respectively. Similarly, the various 2-way, 3-way, and 4-way set intersections divided by the total number of RFID tags in the event define 2-way, 3-way, and 4-way cross correlations, such as the 2-way cross correlation $r_{1,2}$ defined as $$\frac{R_1 \wedge R_2}{total\ RFID\ tags\ in\ the\ event}.$$

The uniquely read tags total RFID tags in the event can be calculated as:

$$\begin{aligned}unique\ tags = & R_1 + R_2 + R_3 + R_4 - (R_1 \wedge R_2) - (R_1 \wedge R_3) - \\ & (R_1 \wedge R_4) - (R_2 \wedge R_3) - (R_2 \wedge R_4) - (R_3 \wedge R_4) + (R_1 \wedge R_2 \wedge R_3) + \\ & (R_1 \wedge R_2 \wedge R_4) + (R_1 \wedge R_3 \wedge R_4) + (R_2 \wedge R_3 \wedge R_4) - (R_1 \wedge R_2 \wedge R_3 \wedge R_4)\end{aligned}$$

The aggregate correlation for all four readers, $Corr_{R_1,R_2,R_3,R_4}$, is therefore the uniquely read RFID tags divided by the total number of RFID tags in the event. In other words, the aggregate correlation can be expressed as:

$$Corr_{R_1,R_2,\ldots,R_n} = \sum_i Corr_{R_i} - \sum_{i<j} r_{i,j} + \sum_{i<j<k} r_{i,j,k} - \ldots \pm r_{1,2,\ldots,n}$$

The aggregated read rate for a set of n RFID-tag readers, such as partition or independent subgroup of RFID-tag readers within a multi-RFID-tag-reader network can then be defined as:

$$ReadRate_{R_1,R_2,\ldots,R_n} = \frac{Corr_{R_1,R_2,\ldots,R_n}}{\min(t_{s_1}, t_{s_2}, \ldots, t_{s_n})}$$

A normalized correlation, $Corr_i^S$, of an RFID-tag reader i with respect to a group of RFID-tag readers j=1 to n is defined as:

$$Corr_i^S = Corr_i \prod_{j=1}^n (1 - r_{i,j})$$

The normalized correlation can be computed iteratively or recursively by renormalizing the remaining nodes in a collision graph each time a node is deleted from the collision graph.

A general strategy for scheduling power-on/power-off intervals in a k-partitioned multi-RFID-tag-reader network that represents one embodiment of the present invention can be obtained from the above-described considerations and quantities. The strategy is to select a first partition from among the k partitions by selecting the partition with the highest aggregated read rate. Then, the nodes in that partition are powered-on, in a first power-on interval, for a length of time equal to the smallest saturation time for any node in the partition. Following the first power-on interval, any nodes that have been powered on for their full saturation times are removed from consideration. Then, a new collision graph representing the remaining nodes is partitioned into m partitions, where m is the cardinality of a minimal partitioning of the nodes, and m is equal to, or less than, k, and a first partition from among the m partitions is selected by selecting the partition with the highest aggregated read rate based on normalization of the remaining nodes with respect to the nodes so far removed from consideration. Then, the nodes in that partition are powered-on, in a first power-on interval, for a length of time equal to the smallest saturation time for any node in the partition. The process continues until a complete cycle of power-on/power-off intervals is obtained, or, in other words, until either all readers have been powered on for their full saturation times, or sufficient power-on intervals to fill up the desired time for a cycle have been constructed. The total optimal cycle time may be the time taken by an RFID tag to travel through the narrowest field of any RFID-tag reader in the multi-RFID-tag-reader network, may be the average time taken by an RFID tag to travel through the fields of the RFID-tag readers in the multi-RFID-tag-reader network, may be empirically derived, or may be otherwise calculated or defined.

Figure 34:
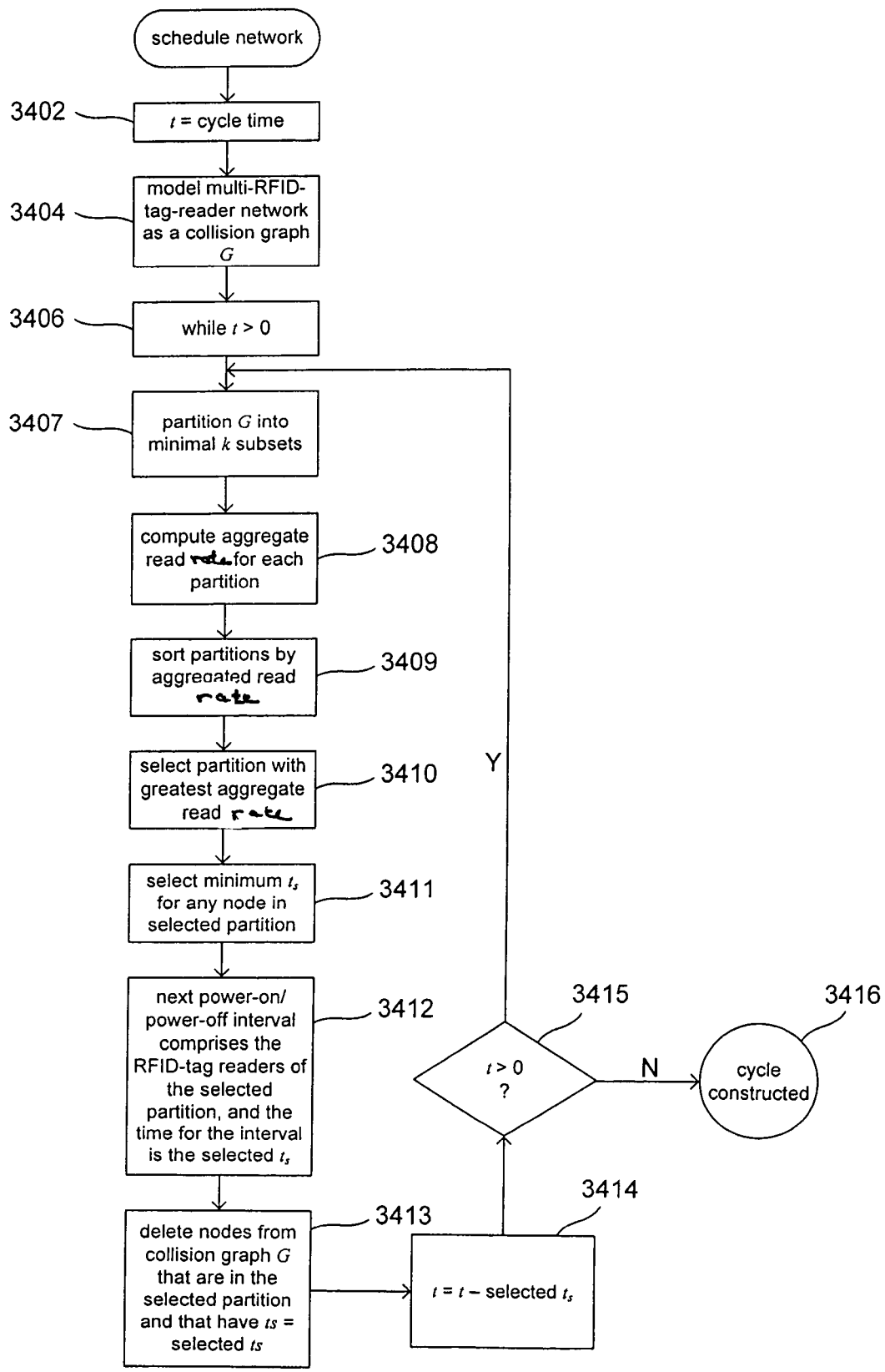
FIG. 34 shows a flow-control diagram for a routine "schedule network" that determines a schedule for a multi-RFID-tag-reader network.

FIG. 34 shows a flow-control diagram for a routine "schedule network" that determines a schedule for a multi-RFID-tag-reader network. In step 3402, a variable t, which stores the remaining cycle time as yet unscheduled, is initialized to the total, available cycle time. Then, in step 3404, the routine "schedule network" creates a collision graph G to model the multi-RFID-tag-reader network. In the while-loop of steps 3406-3415, the routine "schedule network" routine iteratively generates successive power-on/power-off intervals for a cycle of power-on/power-off intervals that represents a schedule for the multi-RFID-tag-reader network. In step 3407, the current collision graph G is partitioned into a minimal number k of independent subgroups of nodes. In step 3408, the aggregate read rate for each partition is determined, and, in step 3409, the partitions are sorted in increasing-aggregate-read-rate order. In step 3410, the first partition, with greatest aggregate read rate, is selected for the next power-on/power-ff interval, and, in step 3411, the routine "schedule network" selects the minimum saturation time $t_s$ for any of the nodes in the selected partition. The next power-on/power-off interval comprises powering on the nodes in the selected partition for a length of time equal to the selected minimum saturation time $t_s$, as shown in step 3412. In step 3413, any nodes in the selected partition with saturation times equal to the selected minimum saturation time $t_s$ are deleted from G, with the remaining nodes renormalized to take the removal of the nodes into account, and, in step 3414, local variable t is updated by subtracting, from the remaining cycle time stored in t, the selected minimum saturation time $t_s$. The while-loop continues until there is no further time in the cycle for additional power-on/power-off cycles. The routine "schedule network" can be used to directly manage an RFID-tag-reader network, or may instead be used to generate a schedule that is subsequently used by a either a centrally controlled or a distributed multi-RFID-tag-reader network.

C++-like Pseudocode Implementation of One Embodiment of the Present Invention A C++-like pseudocode implementation of a method embodiment of the present invention is next provided:

```
 1  typedef Time;
 2  typedef TagReaderId;
 3  const int MAXNODES;
 4  const int MAXP;
 5  const Time MAXTIME;
 6  class node;
 7  typedef node* NodePtr;
 8  class node
 9  {
10    public:
11      Tag ReaderId getID( );
12      double getCorrelation( );
13      double getKwiseXCorrelation(NodePtr* n, int k);
14      Time getSaturationTime( );
15  };
16  class partition
17  {
18    private:
19      NodePtr nodes[MAXNODES];
20      int num;
21      int next;
22      Time tm;
23      double aggregateRR;
24
25    public:
26      void clear( ) {num = 0;};
27      void addNode(NodePtr n) {nodes[num++] = n;};
28      NodePtr getFirst( );
29      NodePtr getNext( );
30      NodePtr getNode(int i) {return nodes[i];};
31      int getNum( ) {return num;};
32      void setFirst(NodePtr n);
33      void setNext(NodePtr n);
34      void setTime(Time t) {tm = t;};
35      Time getTime( ) {return tm;};
36      void setAggregateRR(double corr) {aggregateRR =
              corr / tm;};
37      double getAggregateRR( ) {return aggregateRR;};
38      void sort( );
39      partition( );
40  };
41  NodePtr partition::getFirst( )
42  {
43    if (!num) return 0;
44    else
45    {
46      next = 1;
47      return nodes[0];
48    }
49  }
50  NodePtr partition::getNext( )
51  {
52    if (num == next) return 0;
53    else return nodes[next++];
54  }
55  void partition::setFirst(NodePtr n)
56  {
57    num = 1
58    nodes[0]= n;
59  }
60  void partition::setNext(NodePtr n)
61  {
62    nodes[num++]= n;
63  }
64  class graph
65  {
66    private:
67      node nodes[MAXNODES];
68      partition parts[MAXP];
69      int num;
70      int next;
71      Node Ptr nds[MAXNODES];
72      int ndNums[MAXNODES];
73      double res;
74      int color( );
75      void sortPartitions( );
76      void getAggForKNodes(int p, int K int num);
77
78    public:
79      graph& operator= (graph g);
80      bool addNode (Node Ptr n);
81      bool deleteNode (NodePtr n);
82      bool addEdge (NodePtr n1, NodePtr n2);
83      bool deleteEdge (NodePtr n1, NodePtr n2);
84      int getNumNodes( );
85      NodePtr getFirstNode(int color);
86      NodePtr getNextNode(int color);
87      void clear( );
88      int schedule( );
89      partition* getFirstPartition( );
90      partition* getNextPartition( );
91      graph( );
92  };
93  int graph::schedule( )
94  {
95    int i, j;
96    double agg = 0;
```

```
 97     NodePtr nextN;
 98
 99
100     num = color( );
101     for (i = 0; i < num; i++)
102     {
103             nextN = getFirstNode(i);
104             parts[i].setTime(nextN->getSaturationTime( ));
105             parts[i].setFirst(nextN);
106             nextN = getNextNode(i);
107             while (nextN != 0)
108             {
109                     if (nextN->getSaturationTime( ) <
                            parts[i].getTime( ))
110                             parts[num].setTime(nextN->
                                    getSaturationTime( ));
111                     parts[i].setNext(nextN);
112                     nextN = getNextNode(i);
113             }
114             parts[i].sort( );
115     }
116     for (i = 0; i < num; i++)
117     {
118             for (j =0; j < parts[i].getNum( ); j++)
119             {
120                     res = 0;
121                     getAggForKNodes(i, j, 0);
122                     agg += res;
123             }
124             parts[i].setAggregateRR(agg);
125     }
126     sortPartitions( );
127     return num;
128 }
138 void graph::getAggForKNodes(int p, int k, int nm)
139 {
140     int i, j;
141
142     if (nm == 0)
143     {
144             for (i =0; i < parts[p].getNum( ) - k; i++)
145             {
146                     ndNums[0] = i;
147                     nds[0] = parts[p].getNode(i);
148                     getAggForKNodes(p, k, 1);
149             }
150     }
151     else if (nm <= k)
152     {
153             j = ndNums[nm - 1] + 1;
154             for (i = j; i < parts[p].getNum( ) - (k - nm); i++)
155             {
156                     ndNums[nm] = i;
157                     nds[nm] = parts[p].getNode(i);
158                     getAggForKNodes(p, k, nm + 1);
159             }
160     }
161     else
162     {
163             if (k > 0)
164             {
165               if (nm & 1)
166                 res -= nds[0]->getKwiseXCorrelation(nds, k + 1);
167               else
168                 res += nds[0]->getKwiseXCorrelation(nds, k + 1);
169             }
170             else res += nds[0]->getCorrelation( );
171     }
172 }
164 int main(int argc, char* argv[ ])
165 {
166     graph g;
167     Time nextTime;
168     Time totalTime = 0;
169     Time t;
170     partition* nextPartition;
171     NodePtr n;
172
173     // graph is constructed
174
175     while (g.getNumNodes( ) > 0 && totalTime < MAXTIME)
176     {
177             g.schedule( );
178             nextPartition = g.getFirstPartition( );
179             nextTime = nextPartition->getTime( );
180             totalTime += nextTime;
181
182     // at this point, the next partition to power-on is known,
183     // and the time for the power-on interval is known, as well
184
185             n = nextPartition->getFirst( );
186             t = n->getSaturationTime( );
187
188             while (n != 0)
189             {
190                     g.deleteNode(n);
191                     n = nextPartition->getNext( );
192                     if (n != 0)
193                             if (!n->getSaturationTime( ) == t) n = 0;
194             }
195     }
196 }
```

On lines 1-2, type declarations for types Time and TagReaderID are provided, without implementation. Various different implementations for a time data type are possible, including a simple implementation in which an integer is used to store a number of second, milliseconds, or some other convenient time unit. Identifiers for RFID-tag readers may be port IDs, in a multi-RFID-tag-reader network, alphanumeric character strings, serial numbers, or other such identification.

In lines 3-5, above, three constants, MAXNODES, MAXP, and MAXTIME, are declared. The first two are sizes of arrays used to store varying numbers of nodes and partitions, respectively, while the constant MAXTIME represents the maximum duration of a cycle of power-on/power-off intervals that represent a schedule of a multi-RFID-tag-reader network.

A class node is declared, on lines 8-15. The class node represents a node in a collision graph, as well as an RFID-tag reader in a multi-RFID-tag-reader network. A small set of function members for the class node are declared, but not implemented, since the implementations are both application dependent and relatively straightforward. The declared function members include: (1) getID, which returns an identifier for the RFID-tag reader represented by an instance of the class node; (2) getCorrelation, which returns the correlation of the RFID-tag reader represented by an instance of the class node with an event; (3) getKwiseXCorrelation, which returns a specified k-wise correlation of the RFID-tag reader represented by an instance of the class node with k−1 other RFID-tag readers represented by an array of pointers to the k−1 instances of the class node representing the k−1 other RFID-tag readers; and (4) getSaturationTime, which returns the measured saturation time $t_s$ for the RFID-tag reader represented by an instance of the class node. A pointer type NodePtr is declared, on line 7, for pointers to instances of the class node.

Next, on lines 16-40, a class partition is declared. An instance of the class partition represents an independent subset of RFID-tag readers. Each partition of RFID-tag readers, or nodes, can be associated with an interrogation time—the smallest $t_s$ for any node in the partition, and an aggregate read rate, $Corr_{R_1, R_2, \ldots, R_n}$ for the n nodes in the partition. The class partition includes the following function members, declared on lines 26-38: (1) clear, which clears the current contents of, or resets, an instance of the class partition; (2) addNode, which adds a node to the partition represented by an instance of the class partition; (3) getFirst, which returns a pointer to the first node of the partition represented by an instance of the class partition; (4) getNext, each call to which returns a pointer to a subsequent node of the partition represented by an instance of the class partition; (5) getNode, which returns the $i^{th}$ node the partition represented by an instance of the class partition; (6) getNum, which returns the number of nodes the partition represented by an instance of the class partition; (7) setFirst, which clears the partition represented by an instance of the class partition and adds a first node to the partition; (8) setNext, which adds another node to the partition represented by an instance of the class partition; (9) setTime, which sets the current interrogation time for the partition represented by an instance of the class partition to a time value; (10) getTime, which retrieves the interrogation time for the partition represented by an instance of the class partition; (11) setAggregateRR, which sets the aggregate read rate for the partition represented by an instance of the class partition based on a supplied, aggregate correlation; (12) getAgggregateRR, which returns the aggregate read rate for the partition represented by an instance of the class partition; and (13) sort, which sorts the nodes of the partition represented by an instance of the class partition by saturation times.

On lines 41-63, a few implementations for function members of the class partition, to illustrate the relatively straightforward implementations possible for these function members. The function member sort can be implemented by a Quick Sort algorithm, by other simple sort algorithms, or by invoking sort procedures provided in libraries associated with most development platforms.

Finally, on lines 64-92, a declaration for a class graph is provided. The class graph represents a collision graph, which in turn represents a multi-RFID-tag-reader network. A collision graph includes a number of nodes, representation of edges, in certain implementations both nodes and edges including weights. The class graph includes private data members, declared on lines 69-73, that store information used by the recursive private function member getAggForKNodes, described below. These private data members allow for accumulation of a result value through recursive calls to getAggForKNodes, as well as for keeping track of the node combinations traversed by recursive calls to getAggForKNodes. The class graph includes the following private function members: (1) color, which carries out a minimal coloring of the nodes of the collision graph represented by an instance of the class graph; (2) sortPartitions, which sorts partitions of the nodes of an instance of the class graph in order of decreasing aggregate read rate, and (3) getAggForKNodes, which computes the $k^{th}$ term of aggregate correlation for an independent subset of nodes, or node partition. The class graph includes the following public function members: (1) an assignment operator and various node and edge editing function members declared on lines 79-83, with the deleteNode function member renormalizing all remaining nodes in the graph with respect to the deleted node according to the above-described method for computing a normalized correlation, $Corr_i^S$; (2) getNumNodes, which returns the number of nodes currently present in the collision graph represented by an instance of the class graph; (3) getFirstNode, which returns a first node of a specified color i following a coloring of the collision graph represented by an instance of the class graph; (4) getNextNode, each call of which returns a subsequent node of a specified color i following a coloring of the collision graph represented by an instance of the class graph and following an initial call to getFirstNode; (5) schedule, which computes a next schedule of partitions, based on computed aggregate read rates; and (6) and getFirstPartition and getNextPartition, which provide for retrieving each partition of a set of partitions that together compose a partitioning of the nodes of the collision graph represented by an instance of the class graph.

Next, implementations are provided for the function members schedule and getAggForKNodes of the class graph. Implementations of these two function members, and the routine main, discussed below, represent one embodiment of the scheduling method of the present invention. The routine schedule computes a minimal coloring of the collision graph represented by an instance of the class graph, on line 100. Then, in the for-loop of lines 101-115, the function member schedule constructs a partition for each node partition, the for-loop iterating through the number of colors needed for the minimal coloring, num. While constructing each partition, the function member keeps track of the minimal saturation time for any node of the partition, and sorts the nodes of the constructed partition, on line 114, by increasing saturation times. In the nested for-loops of lines 116-125, the routine schedule computes the aggregate read rate for each partition, term by term, via calls to the function member getAggForKNodes, aggregate correlation, used to compute an aggregate read rate for the partition. The aggregate read rate, as discussed above, is given by:

$$ReadRate_{R_1,R_2,\ldots,R_n} = \frac{Corr_{R_1,R_2,\ldots,R_n}}{\min(t_{s_1}, t_{s_2}, \ldots t_{s_n})}$$

where the aggregate correlation $$Corr_{R_1,R_2,\ldots,R_n} = \sum_i Corr_{R_i} - \sum_{i<j} r_{i,j} + \sum_{i<j<k} r_{i,j,k} - \ldots \pm r_{1,2,\ldots,n}$$

Finally, the partitions are sorted, on line 125, by decreasing aggregate read rate.

An implementation for the function member getAggForKNodes is provided on lines 138-172. This recursive routine computes the $k^{th}$ term of the aggregate correlation. The function member getAggForKNodes is initially called with argument nm=0 and res=0, where res accumulate the value of the $k^{th}$ term over the recursive calls. When argument nm is 0, a pointer the first node for each combination of nodes that contribute to the $k^{th}$ term of the aggregate correlation is placed into the array nds, and a numeric label for the node is placed in the array ndNums, in the for-loop of lines 144-129. Then, function member getAggForKNodes is recursively called to compute the numeric value for the $k^{th}$ term. When nm is less than, or equal to, k, additional nodes and node representations are added to the arrays nds and ndNums, in the for-loop of lines 154-159. Finally, when nm is greater than k, the aggregate correlation term is computed on lines 163-170.

Finally, as exemplary calculation of a cycle of power-on/power-off periods for a multi-RFID-tag-reader network is provided in an exemplary main routine, on lines 164-196. The schedule is iteratively calculated in the while-loop of lines 175-195. During each iteration, the function member schedule is invoked for a graph instance, on line 177, and the next partition, or independent subset, for the cycle is obtained via a call to function member getFirstPartition, on line 178. The time of the power-on/power-off interval is retrieved, on line 179, from the partition. The identities of the nodes can be retrieved from the next partition referenced by local pointer nextPartition. Once the currently determined power-on/power-off interval is processed, either by storing the interval into a computed schedule, or by actually powering on the nodes represented by the partition referenced by local pointer nextPartition, then, in the while-loop of lines 188-194, all nodes within the partition with saturation times equal to the smallest saturation time of any node in the partition are deleted, since these nodes have successfully interrogated all of the RFID tags that they can be expected to successfully interrogate. The iterative procedure halts when either all nodes have been removed from the collision graph, or when sufficient power-on/power-off intervals have been computed to entirely fill up a cycle of power-on/power-off intervals that represents a schedule for the multi-RFID-tag-reader network.

Although the present invention has been described in terms of particular embodiments, it is not intended that the invention be limited to this embodiment. Modifications within the spirit of the invention will be apparent to those skilled in the art. For example, as discussed above, many different techniques for determining the minimal partitioning of a collision graph can be employed, including using many different weighting functions and coloring functions. As discussed above, the minimal partitioning can be further minimized by shutting off nodes, if necessary, to decrease the number of intervals in a given cycle of power-on/power-off intervals that represent a schedule for a multi-RFID-tag-reader network. An almost limitless number of implementations of the scheduling method embodied in the above-described pseudocode are possible, using different control structures, data structures, modular organizations, and by varying other programming parameters. The method embodiments of the present invention may be incorporated into an automated system that continuously monitors and schedules a multi-RFID-tag-reader network in order to track changing conditions and optimize the multi-RFID-tag-reader network for interrogation efficiency. For example, a multi-RFID-tag-reader network may be controlled by a controller or computer system that embodies the method embodiments of the present invention in logic circuits and/or firmware, or in software, respectively, to increase interrogation efficiency of the multi-RFID-tag-reader network by modeling the multi-RFID-tag-reader network as a collision graph and scheduling the multi-RFID-tag-reader network. The method embodiments of the present invention may also be used to prepare a static schedule by which a centrally controlled or distributed multi-RFID-tag-reader network is scheduled.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for scheduling a multi-RFID-tag-reader network, the method comprising:
    selecting a cycle time for the schedule;
    modeling the multi-RFID-tag-reader network as a collision graph; and iteratively
    determining a next power-on/power-off interval for a cycle of power-on/power-off intervals that together compose the schedule by
        selecting a next partition from a minimal partitioning of the collision graph with a greatest aggregate read rate, and
        removing one or more nodes from the collision graph
    until sufficient power-on/power-off intervals have been determined to complete the cycle.

2. The method of claim 1 wherein selecting a cycle time for the schedule further includes selecting a time during which a sufficient number of power-on/power-off intervals may be scheduled to achieve a specified RFID-tag-interrogation efficiency, the length of each power-on/power-off interval having a duration at least equal to the minimum saturation time for at least one RFID-tag reader powered on during the power-on/power-off interval.

3. The method of claim 1 wherein the collision graph includes nodes, each node representing an RFID-tag reader, and edges, each edge representing an interference between the RFID-tag readers represented by two nodes connected by the edge.

4. The method of claim 3 wherein selecting a next partition from a minimal partitioning of the collision graph further comprises:
    coloring nodes of the collision graph to assign one of k colors to each node in the collision graph so that no two nodes connected by a single edge have an identical, assigned color, thereby partitioning the collision graph into k partitions;
    computing an aggregate read rate for each of the k partitions; and
    selecting a partition with a greatest aggregate read rate.

5. The method of claim 4 wherein selecting a next partition from a minimal partitioning of the collision graph further comprises selecting the RFID-tag readers represented by nodes of the selected partition for powering on in the next power-on/power-off interval, powering off all remaining RFID-tag readers, and selecting as a duration for the next interval a minimum saturation time for any RFID-tag reader represented by any node in the selected partition.

6. The method of claim 4 wherein the aggregate read rate for a set of RFID-tag readers represented by collision-graph nodes $R_1, R_2, \ldots, R_m$ is defined as $$ReadRate_{R_1,R_2,\ldots,R_m} = \frac{Corr_{R_1,R_2,\ldots,R_m}}{\min(t_{s_1}, t_{s_2}, \ldots, t_{s_m})}$$

where $t_{s_i}$ is a saturation time for RFID-tag reader i and $Corr_{R_1,R_2,\ldots,R_m}$ is the aggregate correlation defined as $$Corr_{R_1,R_2,\ldots,R_m} = \sum_i Corr_{R_i}^S - \sum_{i<j} r_{i,j} + \sum_{i<j<k} r_{i,j,k} - \ldots \pm r_{1,2,\ldots,m}$$

where $r_{i\ldots m}$ is a cross correlation between RFID-tag readers i through m and $Corr_i^S$ is a normalized correlation of an RFID-tag reader i with respect to a group of RFID-tag readers j=1 to m defined as $$Corr_i^S = Corr_i \prod_{j=1}^{m} (1 - r_{i,j})$$

and wherein the RFID-tag readers j=1 to m are RFID-tag readers, the nodes representing which have been deleted from the collision graph.

7. The method of claim 1 wherein removing one or more nodes from the collision graph further comprises:
deleting from the collision graph any nodes that are powered on during the next power-on/power-off interval for a duration of time equal to their saturation times.

8. The method of claim 1 wherein sufficient power-on/power-off intervals have been determined to complete the cycle when the sum of the durations of the power-on/power-off intervals is equal to, or greater than, the selected cycle time.

9. Computer instructions encoded in a tangible computer readable medium that implement a method for scheduling a multi-RFID-tag-reader network comprising:
selecting a cycle time for the schedule;
modeling the multi-RFID-tag-reader network as a collision graph; and
iteratively
determining a next power-on/power-off interval for a cycle of power-on/power-off intervals that together compose the schedule by
selecting a next partition from a minimal partitioning of the collision graph with a greatest aggregate read rate, and
removing one or more nodes from the collision graph until sufficient power-on/power-off intervals have been determined to complete the cycle.

10. A multi-RFID-tag-reader network that operates according to a schedule comprising a cycle of power-on/power-off intervals, during each of which one or more RFID-tag readers are powered on, and one or more RFID-tag-readers are powered off, the multi-RFID-tag-reader network comprising:
a number of RfID-tag readers:
the schedule according to which the number of RFID-tag readers operate: and
logic that powers on and powers off one or more RFID-tag readers according to the schedule,
wherein the schedule is determined by a method comprising:
selecting a cycle time for the schedule;
modeling the multi-RFID-tag-reader network as a collision graph; and
iteratively
determining a next power-on/power-off interval for a cycle of power-on/power-off intervals that together compose the schedule by
selecting a next partition from a minimal partitioning of the collision graph with a greatest aggregate read rate, and
removing one or more nodes from the collision graph until sufficient power-on/power-off intervals have been determined to complete the cycle.

\* \* \* \* \*

UNITED STATES PATENT AND TRADEMARK OFFICE
CERTIFICATE OF CORRECTION

PATENT NO. : 8,093,989 B2
APPLICATION NO. : 11/635738
DATED : January 10, 2012
INVENTOR(S) : Vinay Deolaliker et al.

It is certified that error appears in the above-identified patent and that said Letters Patent is hereby corrected as shown below:

In column 24, line 66, in Claim 6, delete "$r_i \ldots {}_m$" and insert -- $r_i, \ldots, {}_m$ --, therefor.

In column 26, line 13, in Claim 10, delete "RfID-tag" and insert -- RFID-tag --, therefor.

In column 26, line 15, in Claim 10, delete "operate:" and insert -- operate; --, therefor.

Signed and Sealed this
Fourth Day of December, 2012

David J. Kappos
*Director of the United States Patent and Trademark Office*